(12) United States Patent
Li et al.

(10) Patent No.: US 8,577,508 B2
(45) Date of Patent: Nov. 5, 2013

(54) CONVERTER CONTROL OF VARIABLE-SPEED WIND TURBINES

(75) Inventors: Shuhui Li, Tuscaloosa, AL (US); Timothy A. Haskew, Northport, AL (US)

(73) Assignee: University of Alabama, Tuscalossa, AL (US)

( * ) Notice: Subject to any disclaimer, the term of this patent is extended or adjusted under 35 U.S.C. 154(b) by 880 days.

(21) Appl. No.: 12/532,890

(22) PCT Filed: May 5, 2008

(86) PCT No.: PCT/US2008/062641
§ 371 (c)(1),
(2), (4) Date: Nov. 3, 2009

(87) PCT Pub. No.: WO2008/137836
PCT Pub. Date: Nov. 13, 2008

(65) Prior Publication Data
US 2010/0109328 A1    May 6, 2010

Related U.S. Application Data

(60) Provisional application No. 60/916,007, filed on May 4, 2007.

(51) Int. Cl.
*G05D 3/12* (2006.01)
*H02P 9/00* (2006.01)
*F03D 9/00* (2006.01)
*H02M 3/156* (2006.01)

(52) U.S. Cl.
CPC ............. *H02M 3/156* (2013.01); *Y02E 10/763* (2013.01)

USPC ............... 700/287; 700/286; 700/90; 322/44; 322/43; 322/20; 290/2; 290/44; 323/283

(58) Field of Classification Search
USPC .......................................... 700/286; 290/244
See application file for complete search history.

(56) References Cited

U.S. PATENT DOCUMENTS

| | | | | |
|---|---|---|---|---|
| 5,252,029 A * | 10/1993 | Barnes | ............ | 416/142 |
| 5,652,485 A * | 7/1997 | Spiegel et al. | ............ | 318/147 |
| 5,798,631 A | 8/1998 | Spee | ............ | 322/25 |
| 6,118,678 A * | 9/2000 | Limpaecher et al. | ............ | 363/60 |
| 6,765,315 B2 | 7/2004 | Hammerstrom | ............ | 307/66 |
| 6,972,972 B2 | 12/2005 | Duncan | ............ | 363/50 |
| 7,042,110 B2 * | 5/2006 | Mikhail et al. | ............ | 290/44 |
| 7,205,676 B2 | 4/2007 | Ichinose | ............ | 290/44 |
| 7,233,129 B2 * | 6/2007 | Erdman et al. | ............ | 322/17 |

(Continued)

OTHER PUBLICATIONS

Abo-Khalil, A.; and Lee, D.-C., "DC-Link Copacitance Estimation in AC/DC/AC PWM Converters Using Voltage Injection", Sep./Oct. 2008, IEEE Transactions on Industry Applications, vol. 44, No. 5.*

(Continued)

*Primary Examiner* — Mohammad Ali
*Assistant Examiner* — Kelvin Booker
(74) *Attorney, Agent, or Firm* — Meunier Carlin & Curfman, LLC

(57) ABSTRACT

Embodiments according to the present invention provide methods and a system for a control approach that effectively maintains the DC link voltage at a constant set value under variable system conditions and keeps the converter operating within an optimal power factor range.

8 Claims, 15 Drawing Sheets

(56) References Cited

U.S. PATENT DOCUMENTS

| | | | | |
|---|---|---|---|---|
| 7,321,221 B2* | 1/2008 | Bucker et al. | | 322/44 |
| 7,339,355 B2* | 3/2008 | Erdman et al. | | 322/29 |
| 7,417,333 B2* | 8/2008 | Miller et al. | | 290/44 |
| 7,432,686 B2* | 10/2008 | Erdman et al. | | 322/44 |
| 7,471,007 B2* | 12/2008 | Bücker et al. | | 290/44 |
| 7,518,257 B2* | 4/2009 | Guey et al. | | 290/44 |
| 7,535,120 B2* | 5/2009 | Erdman et al. | | 307/47 |
| 7,629,705 B2* | 12/2009 | Barker et al. | | 290/55 |
| 7,830,127 B2* | 11/2010 | Corcelles Pereira et al. | | 322/24 |
| 7,881,079 B2* | 2/2011 | Prasad et al. | | 363/39 |
| 8,008,793 B2* | 8/2011 | Andresen | | 290/44 |
| 8,030,791 B2* | 10/2011 | Lang et al. | | 290/44 |
| 8,116,914 B2* | 2/2012 | Oohara et al. | | 700/287 |
| 8,350,397 B2* | 1/2013 | Lang et al. | | 290/44 |
| 8,368,238 B2* | 2/2013 | Yasugi et al. | | 290/44 |
| 2003/0006745 A1* | 1/2003 | Hammerstrom et al. | | 323/283 |
| 2005/0012339 A1* | 1/2005 | Mikhail et al. | | 290/44 |
| 2005/0122083 A1* | 6/2005 | Erdman et al. | | 322/20 |
| 2006/0163881 A1* | 7/2006 | Bucker et al. | | 290/44 |
| 2006/0244265 A1* | 11/2006 | Ichinose et al. | | 290/44 |
| 2007/0187955 A1* | 8/2007 | Erdman et al. | | 290/44 |
| 2008/0007121 A1* | 1/2008 | Erdman et al. | | 307/47 |
| 2008/0018309 A1* | 1/2008 | Erdman et al. | | 322/20 |
| 2008/0069692 A1* | 3/2008 | Oohara et al. | | 416/31 |
| 2008/0093853 A1* | 4/2008 | Barker et al. | | 290/44 |
| 2008/0093854 A1* | 4/2008 | Bucker et al. | | 290/44 |
| 2008/0106098 A1* | 5/2008 | Miller et al. | | 290/44 |
| 2008/0129050 A1* | 6/2008 | Guey et al. | | 290/43 |
| 2008/0150285 A1* | 6/2008 | Corcelles Pereira et al. | | 290/44 |
| 2008/0164697 A1* | 7/2008 | Schram et al. | | 290/44 |
| 2008/0238108 A1* | 10/2008 | Edelson et al. | | 290/40 C |
| 2009/0187282 A1* | 7/2009 | Menke et al. | | 700/287 |
| 2009/0237963 A1* | 9/2009 | Prasad et al. | | 363/40 |
| 2010/0025995 A1* | 2/2010 | Lang et al. | | 290/44 |
| 2010/0109447 A1* | 5/2010 | Achilles et al. | | 307/153 |
| 2011/0018270 A1* | 1/2011 | Corcelles Pereira et al. | | 290/44 |
| 2011/0057444 A1* | 3/2011 | Dai et al. | | 290/44 |
| 2011/0156388 A1* | 6/2011 | Yasugi et al. | | 290/44 |
| 2011/0316490 A1* | 12/2011 | Lang et al. | | 322/21 |
| 2012/0056602 A1* | 3/2012 | Li et al. | | 322/89 |
| 2012/0112551 A1* | 5/2012 | Li et al. | | 307/82 |

OTHER PUBLICATIONS

Agrawal, A.K.; Munshi, B.; and Kayal, S., "Study of Wind Turbine Driven DFIG Using AC/DC/AC Converter", 2009, Thesis for Bachelor of Technology in Electrical Engineering at Department of Electrical Engineering, National Institute of Technology, Rourkela.*

Malinowski, M.; and Bernet, S., "Simple Control Scheme of Three-Level PWM Converter Connecting Wind Turbine with Grid", 2004, Nordic Wind Power Conference, Gotborg, Sweden.*

Park, H.-G.; Lee, D.-C.; and Kim, H.-G., "Cost-Effective Converters for Micro Wind Turbine Systems Using PMSG", Apr. 2008, Journal of Power Electronics, vol. 8, No. 2.*

Pena, R.S.; Cardenas, R.J.; Clare, J.C.; and Asher, G.M., "Control Strategies for Boltage Control of a Boost Type PWM Converter", 2001, 2001 IEEE Power Electronics Specialist Conference, vol. 2, pp. 730-735.*

Song, S.-H.; Kang, S.-I.; and Hahm, N.-K., Implementation and Control of Grid Connected AC-DC-AC Power Converter for Variable Speed Wind Energy Conversion System, Feb. 2003, Eight Annual IEEE Applied Power Electronics Conference and Exposition, vol. 1, pp. 154-158.*

Velpuri, A.N.; Hess, H.L.; Law, J.D.; Cegnar, E.J.; and Muljadi, E., "AC/DC/AC Converter Modulation Strategy With Natural Zero Sequence Rejection Using Only One Six-Switch Inverter Module", May 2007, IEEE International Conference on Electric Machines and Drives 2007, vol. 2, pp. 1226-1233.*

Weiss, G.; Zhong, Q.-C.; Green, T.; and Liang, J., "H repetitive Control of DC-AC Converters in Micro-grids", Dec. 2002, IEEE Conference on Decision and Control.*

Xu D.; and Luo, Z. "A Novel AC-DC Converter for PMSG Variable Speed Wind Energy Conversion System", May 2009, IEEE 6th International Power Electronics and Motion Control Conference.*

Raju, A.B.; Chatterjee, K.; and Fernandes, B.G., "A Simple Maximum Power Point Tracker for Grid Connected Variable Speed Wind Energy Conversion System With Reduced Switch Count Power Converters", Jun. 2003, IEEE 34th Annual Power Electronics Specialist Conference, vol. 2, pp. 748-753.*

Baggu, M.M., "Advanced Control Techniques for Doubly FED Induction Generator-Based Wind Turbine Converters to Improve Low Voltage Ride-Through During System Imbalances", 2009, Dissertation for Doctor of Philosophy in Electrial Engineering, Missouri University of Science and Technology.*

Dong, D., "Modeling and Control Design of Bidirectional PWM Converter for Single-Phase Energy Systems", May 2009, Thesis for Master of Science in Electrical Engineering at Virginia Polytechnic Institute and State University.*

Kulka, A., "Sensorless Digital Control of Grid Connected Three Phase Converters for Renewable Sources", Mar. 2009, Thesis for Degree of Philosophiae Doctor, Department of Electric Power Engineering, Norwegian University of Science and Technology.*

International Preliminary Report on Patentability issued Nov. 10, 2009 for International Application No. PCT/US2008/062641 filed on May 5, 2008 and published as WO/2008/137836 on Nov. 13, 2008 (Applicant—University of Alabama // Inventors—Li et al.) (4 pages).

International Search Report and Written Opinion issued Aug. 8, 2008 for International Application No. PCT/US2008/062641 filed on May 5, 2008 and published as WO/2008/137836 on Nov. 13, 2008 (Applicant—University of Alabama // Inventors—Li et al.) (5 pages).

Ackermann T and Söder L., An Overview of Wind Energy-Status 2002, *Renew. Sustain Energy Rev.*, vol. 6, No. 1-2, pp. 67-128, Feb./Apr. 2002.

Duarte JL, et al., Reference Frames Fit for Controlling PWM Rectifiers, *IEEE Trans. Ind. Electron.*, vol. 46, No. 3, pp. 628-630, Jun. 1999.

GE Wind Energy. GE Wind Turbine Brochures, 62 pages, Jan. 12, 2012.

Hansen, AD, et al., Overall Control Strategy of Variable Speed Doubly-Fed Induction Generator Wind Turbine, in *Grid integration and electrical systems of wind turbines and wind farms (CD-ROM)*, Nordic Wind Power Conference 2004, Chalmers University of Technology, Goteborg, Sweden, 7 pages, Mar. 1-2, 2004.

Hansen LH, et al., Conceptual Survey of Generators and Power Electronics for Wind Turbines, Risø National Laboratory, Roskilde, Denmark, Tech. Rep. Risø-R-1205(EN), ISBN 87-550-2743-8, 108 pages, Dec. 2001.

Hopfensperger B, et al., Stator Flux Oriented Control of a Cascaded Doubly-Fed Induction Machine, *IEE Proc. Electr. Power Appl.*, vol. 146, No. 6, pp. 597-605, Nov. 1999.

Kazachkov YA, et al., Modeling Wind Farms for Power System Stability Studies, in *Proceedings of 2003 IEEE PES General Meeting*, Toronto, Canada, pp. 1526-1533, Jul. 13-17, 2003.

Kling WL and Slootweg JG, Wind Turbines as Power Plants, in *Proceedings of the IEEE/Cigré workshop on Wind Power and the Impacts on Power Systems*, Oslo, Norway, 7 pages, Jun. 17-18, 2002.

Li S and Haskew T, Analysis of Decoupled d-q Vector Control in DFIG Back-to-Back PWM Converter, in *IEEE Power Engineering Society General Meeting*, Tampa, FL, USA, 7 pages, 2007.

Li S and Haskew T, Transient and Steady-State Simulation Study of Decoupled d-q Vector Control in PWM Converter of Variable Speed Wind Turbines, *The 33rd Annual Conference of the IEEE Industrial Electronics Society (IECON)*, Taipei, Taiwan, 8 pages, Nov. 5-8, 2007.

Li S and Sinha S, A Simulation Study of Double-Fed Induction Generator for Wind Energy Conversion Using PSpice, in *Proceedings of 2006 IEEE PES General Meeting*, Montreal, Quebec, Canada, pp. 1-8, Jun. 18-22, 2006.

Meirhaeghe PV, Double Fed Induction Machine: a EUROSTAG Model, Tractebel Engineering, 8 pages, 2003.

Miller NW, et al., Dynamic Modeling of GE 1.5 and 3.6 Wind Turbine-Generators, Version 3.0, GE Power Systems, 31 pages, Oct. 27, 2003.

(56) References Cited

OTHER PUBLICATIONS

Morel L, et al., Double-Fed Induction Machine: Converter Optimization and Field Oriented Control without Position Sensor, *IEE Proc. Electr. Power Appl.*, vol. 145, No. 4, pp. 360-368, Jul. 1998.

Nordex. Nordex Wind Turbine Brochures, 38 pages, Jan. 12, 2012.

Pena R, et al., Doubly Fed Induction Generator Using Back-to-Back PWM Converters and its Application to Variable-Speed Wind-Energy Generation, *IEE Proc. Electr. Power Appl.*, vol. 143, No. 3, pp. 231-241, May 1996.

Slootweg JG, et al., General Model for Representing Variable Speed Wind Turbines in Power System Dynamics Simulations, *IEEE Trans. on Power Syst.*, vol. 18, No. 1, pp. 144-151, Feb. 2003.

Thiringer T, et al., Grid Disturbance Response of Wind Turbines Equipped with Induction Generator and Doubly-Fed Induction Generator, in *Proceedings of 2003 IEEE PES General Meeting*, Toronto, Canada, 6 pages, Jul. 13-17, 2003.

Usaola J and Ledesma P, Transient Stability Studies in Grids with Great Wind Power Penetration: Modeling Issues and Operation Requirements, in *Proceedings of 2003 IEEE PES General Meeting*, Toronto, Canada, pp. 1-8, Jul. 13-17, 2003.

Vestas. Vestas Wind Turbine brochures, 132 pages, Jan. 12, 2012.

Wang S and Ding Y, Stability Analysis of Field Oriented Doubly-Fed Induction Machine Drive Based on Computer Simulation, *Electric Machines and Power Systems*, vol. 21, No. 1, pp. 11-24, 1993.

Xu L and Wei C, Torque and Reactive Power Control of a Doubly Fed Induction Machine by Position Sensorless Scheme, *IEEE Trans. Ind. Appl.*, vol. 31, No. 3, pp. 636-642, May/Jun. 1995.

\* cited by examiner

Decoupled d-q vector control structure for grid-side converter

Grid-side converter representation and equivalent circuit

Grid-side converter real power characteristics

Characteristics of reactive power absorbed from the grid

Amplitude of the injected voltage to the grid by grid-side converter

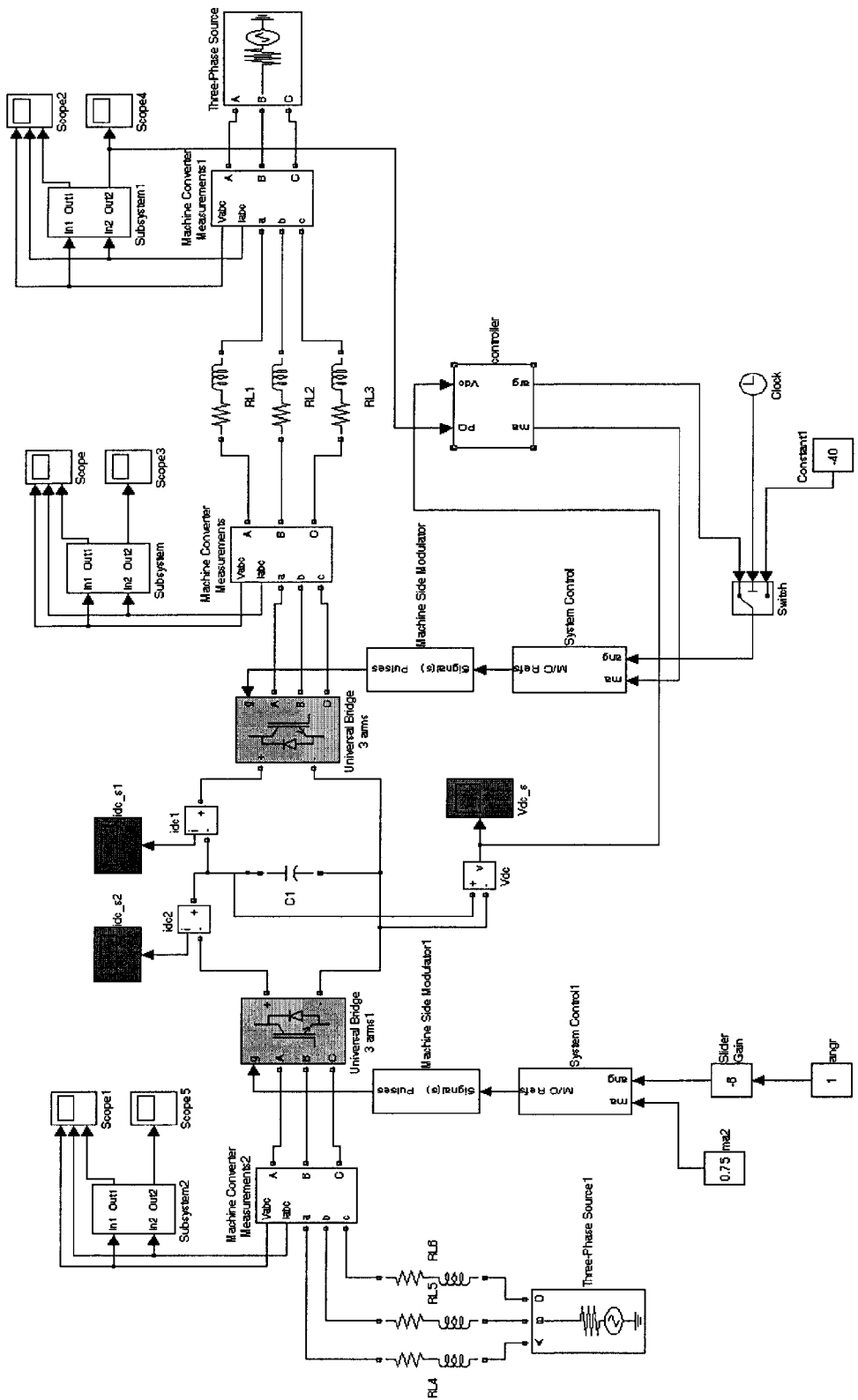
FIG. 9 Integrated machine- and grid-side converter Simulink simulation system with controls DC link voltage by control approach according to an embodiment of the present invention DC link voltage according to the conventional control approach Real and reactive power absorbed from the grid by control approach according to an embodiment of the present invention Real and reactive power absorbed from the grid voltage by conventional control approach

CONVERTER CONTROL OF VARIABLE-SPEED WIND TURBINES

CROSS-REFERENCE TO RELATED APPLICATION

This application claims benefit of and priority to U.S. provisional patent application Ser. No. 60/916,007, filed May 4, 2007, which is fully incorporated herein by reference and made a part hereof.

BACKGROUND

1. Field of the Invention

This invention relates generally to control systems and more specifically to converter control of variable-speed wind turbines.

2. Background

Wind power is today's most rapidly growing renewable energy source. Large-scale wind generation facilities have become a very visible component of the interconnected power grid in many portions of the United States and around the world. Wind turbines can operate at either fixed speed or variable speed. For a fixed-speed wind turbine, the generator is directly connected to the electrical grid. For a variable speed wind turbine, the generator is controlled by power electronic equipment. The two most-common variable speed wind turbines are wind turbines that use direct-driven synchronous generators (DDSG) or double-fed induction generators (DFIG). For both of them, a frequency converter such as a pulse-width modulation (PWM) AC/DC/AC frequency converter is connected between the grid and the generator. FIG. 1A illustrates an embodiment of an AC/DC/AC converter in modern variable-speed synchronous generator wind turbine, and FIG. 1B illustrates an embodiment of an AC/DC/AC converter in variable-speed DFIG wind turbine. For a DDSG wind turbine, the converter is connected between the generator and the grid, as shown in FIG. 1A, and for the DFIG wind turbine, the converter is connected between the rotor circuit and the grid, as shown in FIG. 1B.

A doubly-fed induction generator is a standard, wound rotor induction machine with its stator windings directly connected to the grid and its rotor windings connected to the grid through an AC/DC/AC frequency converter (FIG. 1B). In modern DFIG designs, the frequency converter is comprised of two self-commutated PWM converters, a machine-side converter and a grid-side converter, with an intermediate DC voltage link. The converter connected to the induction rotor circuit is the machine-side converter, and the converter connected to the grid is the grid-side converter. Traditionally, each of these two PWM converters is controlled by using decoupled d-q control approaches, as are known in the art. Basically, the machine-side converter controls the real and reactive power production of the induction machine, and the grid-side converter controls the dc-link voltage and the reactive power absorbed from the grid by the converter. The general control technique for the grid-side converter control, which is widely used in wind power industry, is a decoupled d-q control approach that uses the direct (d) axis current component for real power control and quadrature (q) axis current component for reactive power control. By controlling the converters on both sides, the DFIG characteristics can be adjusted so as to achieve maximum of effective power conversion or capturing capability for a wind turbine and to control its power generation with less fluctuation. However, to meet these needs, the grid-side converter should be controlled in such a way to maintain a constant DC-link capacitor voltage and to keep the converter operation at a desired power factor.

Therefore, what is desired are control systems and methods that overcome challenges present in the art, some of which are described above.

SUMMARY OF THE INVENTION

Embodiments according to the present invention provide methods and a system for a control approach that effectively maintains the DC link voltage at a constant set value under variable system conditions and keeps the converter operating within an optimal power factor range.

Additional advantages of the invention will be set forth in part in the description which follows, and in part will be obvious from the description, or may be learned by practice of the invention. The advantages of the invention will be realized and attained by means of the elements and combinations particularly pointed out in the appended inventive concepts. It is to be understood that both the foregoing general description and the following detailed description are exemplary and explanatory only and are not restrictive of the invention, as claimed.

BRIEF DESCRIPTION OF THE DRAWINGS

The accompanying drawings, not drawn to scale, which are incorporated in and constitute a part of this specification, illustrate embodiment(s) of the invention and together with the description, serve to explain the principles of the invention:

FIG. 9 illustrates an embodiment of an integrated machine- and grid-side converter Simulink simulation system with controls according to an embodiment of the present invention;

DESCRIPTION OF THE PREFERRED EMBODIMENTS

Figure 1A:
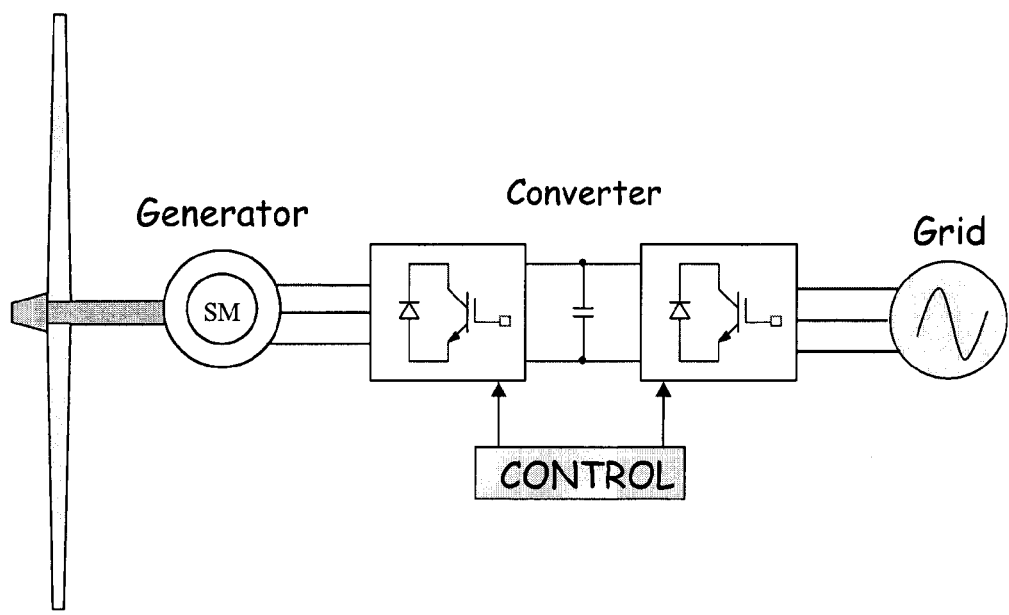
FIG. 1A illustrates an embodiment of a variable-speed synchronous generator wind turbine.
Figure 1B:
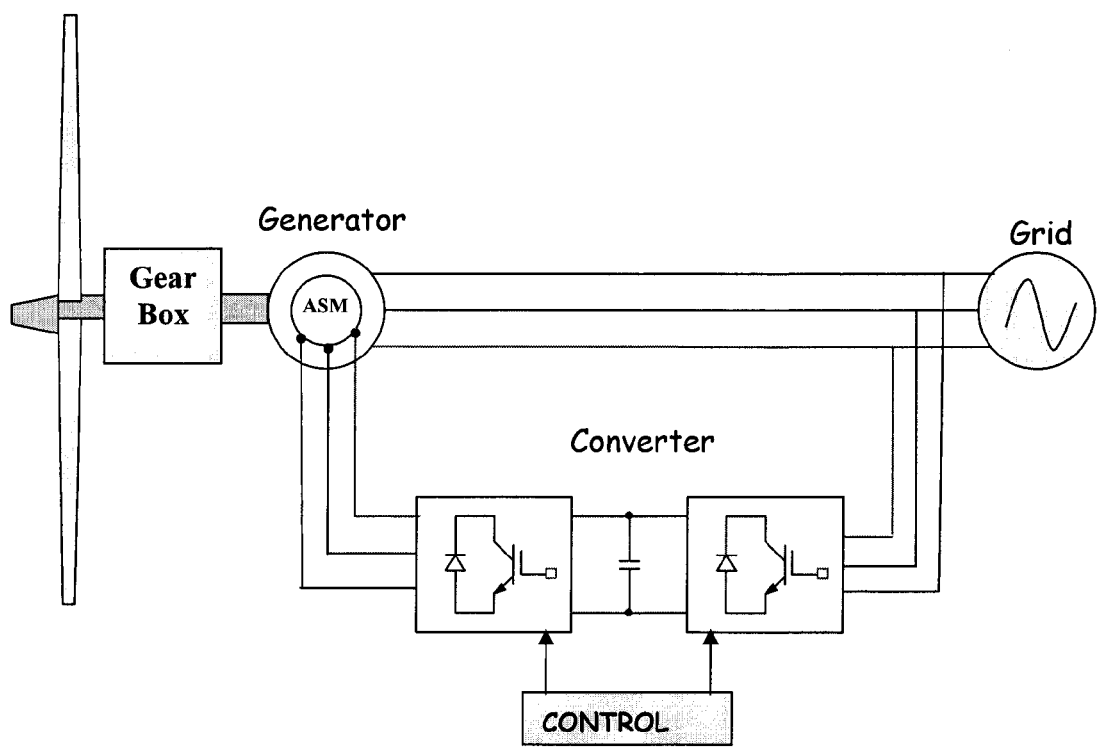
FIG. 1B illustrates an embodiment of a variable-speed doubly-fed induction generator wind turbine.

The present invention may be understood more readily by reference to the following detailed description of preferred embodiments of the invention and the Examples included therein and to the Figures and their previous and following description.

As used in the specification and the appended claims, the singular forms "a," "an" and "the" include plural referents unless the context clearly dictates otherwise. Thus, for example, reference to "a" or "an" endpoint device may include two or more endpoint devices.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In this specification and in the claims which follow, reference will be made to a number of terms which shall be defined to have the following meanings: "Optional" or "optionally" means that the subsequently described event or circumstance may or may not occur, and that the description includes instances where said event or circumstance occurs and instances where it does not.

Reference will now be made in detail to the present embodiments according to the invention, examples of which are illustrated in the accompanying drawings. Wherever possible, the same reference numbers are used throughout the drawings to refer to the same or like parts.

As will be appreciated by one skilled in the art, the preferred embodiment or aspects of the preferred embodiment may be implemented as a method, a data processing system, or a computer program product. Accordingly, the preferred embodiment may take the form of an entirely hardware embodiment, an entirely software embodiment, or an embodiment combining software and hardware aspects. Furthermore, implementations of the preferred embodiment or aspects of the preferred embodiment may take the form of a computer program product on a computer-readable storage medium having computer-readable program instructions (e.g., computer software) embodied in the storage medium. More particularly, implementations of the preferred embodiments may take the form of web-implemented computer software. Any suitable computer-readable storage medium may be utilized including hard disks, CD-ROMs, optical storage devices, magnetic storage devices, etc.

The preferred embodiments according to the present invention are described below with reference to block diagrams and flowchart illustrations of methods, apparatuses (i.e., systems) and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus, such as the ones described below, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 2:
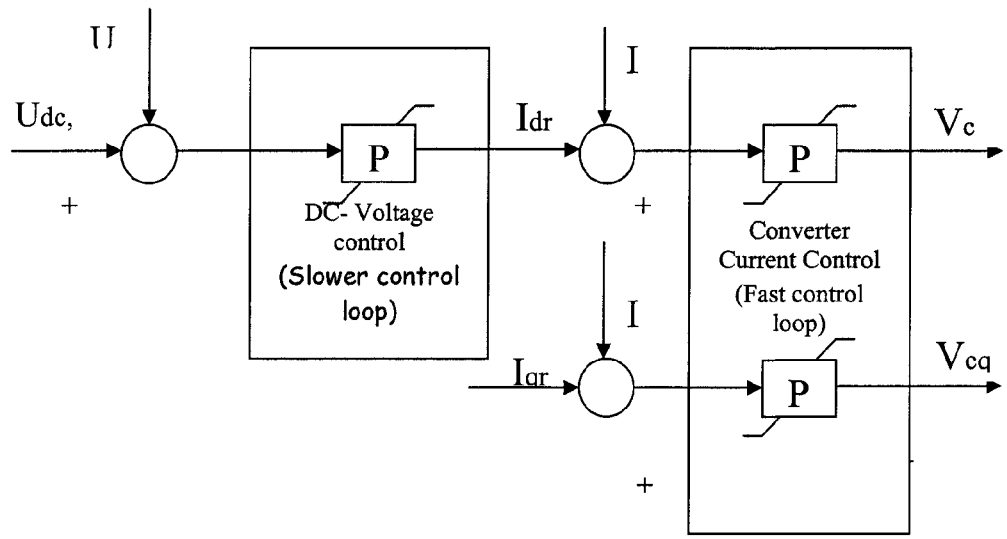
FIG. 2 illustrates an embodiment of a grid-side converter controller in variable-speed wind turbine generators.

Present technology for controlling a grid-side PWM converter is generally a two-stage controller operating in a grid AC voltage reference frame as shown by FIG. 2. When using the grid AC voltage as the reference frame, the d-axis current represents the active component, and the q-axis current represents the reactive component. The d and q components are used to regulate converter DC link voltage and reactive power, respectively, through a voltage-regulated PWM converter scheme in modern variable speed wind turbine designs. The d-q voltage control signals in the grid-side controller are obtained by comparing the d- and q-current set points to the actual d- and q-currents to the grid as shown in the second stage controller in FIG. 2, and are the final control actions actually applied to the grid-side converter. Present technology uses d-axis voltage, $V_{cd}$, for DC link voltage control, and q-axis voltage, $V_{cq}$, for reactive power control (reference FIG. 2). The control of the grid-side converter is important because if the control goals of the grid-side converter cannot be met, all other control objectives will be affected in a variable speed wind turbine. It can also affect both wind turbine and electric power system operation and stability.

In many instances, present technology for controlling the grid-side PWM converter is ineffective in maintaining constant DC link voltage and in compensating reactive power. Therefore, described herein, are embodiments of control principles derived through theoretical study and computer simulation, and embodiments of control systems developed based on the concepts of fuzzy, adaptive, and PID control to implement the newly developed control principle. Among the many advantages of embodiments according to the invention are: 1) maintaining constant DC link voltage effectively; 2) improving maximum power capture capability of variable-speed wind turbines; 3) enhancing wind turbine efficiency; 4) avoiding problems and deficiencies existing in current grid-side converter control technology used in variable-speed wind turbines; 5) improving effective coordination and integration of different wind turbine generator components; and 6) improving electric power system stability and reliability.

Other technical characteristics of embodiments of the invention over present technology include 1) unlike traditional d-q vector control strategy that uses d-axis voltage, $V_{cd}$, for DC link voltage control, and q-axis voltage, $V_{cq}$, for reactive power control (FIG. 2), embodiments of this invention use q-axis voltage, $V_{cq}$, for DC link voltage control, and d-axis voltage, $V_{cd}$, for reactive power control (FIG. 3); 2) traditional d-q vector control approach requires mathematical models for the converter, the grid system, and the DC link capacitor, which are usually inaccurate for a practical system, however embodiments of this invention develop an error driven and modification approach for the controller design of the grid-side converter and do not require mathematical models for those system components; 3) traditional approaches require a lot of signals through sensors for the grid-side converter control, but embodiments of this invention require only two signals to be collected for the control objectives (they include i) DC link voltage, and ii) reactive power absorbed from the grid by the combined grid-side converter and grid filter); 4) traditional approaches use PID control technology, but embodiments of this invention use technologies and concepts involving i) fuzzy control, ii) adaptive control, and iii) conventional PID control; 5) traditional approaches do not effectively consider the restriction of converter operating characteristics to controller design, but embodiments of this invention consider those effects in designing the new control technique; and 6) embodiments of this invention provide means to overcome several challenges of traditional converter control technology, including robustness, stability, performance, and adaptability to widely varying system conditions.

Conventional PWM Grid-Side Converter Control

The conventional control mechanism for PWM grid-side converter control is based upon the decoupled d-q vector control concept [10-15]. A typical and comprehensive discussion about the grid-side converter control, both analytically and experimentally, was given by Pena, Clare, and Asher in 1996 [12]. In their paper, a decoupled d-q vector-control approach is used, with the d-q reference frame oriented along the stator (or supply) voltage vector position.

Figure 4:
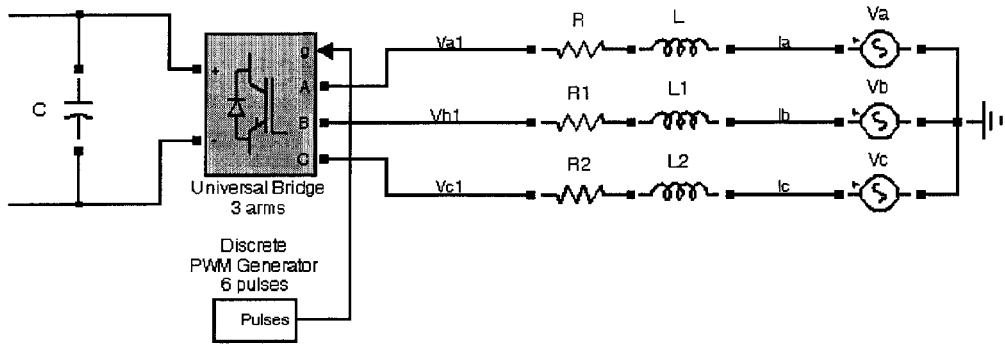
FIG. 4 illustrates an exemplary grid-side converter schematic.

FIG. 4 shows a fundamental schematic of an embodiment of a grid-side converter [12]. In the figure, a DC-link capacitor is on the left and a three-phase grid voltage is on the right. The voltage balance across the inductors is:

$$\begin{bmatrix} v_a \\ v_b \\ v_c \end{bmatrix} = R \begin{bmatrix} i_a \\ i_b \\ i_c \end{bmatrix} + L \frac{d}{dt} \begin{bmatrix} i_a \\ i_b \\ i_c \end{bmatrix} + \begin{bmatrix} v_{a1} \\ v_{b1} \\ v_{c1} \end{bmatrix} \qquad (1)$$

where L and R are the line inductance and resistance of the transformer or the grid filter. When transforming (1) to the d-q reference frame that has the same speed as that of the grid voltage, (1) becomes (2) where $\omega_s$ is the angular frequency of the grid voltage.

$$\begin{bmatrix} v_d \\ v_q \end{bmatrix} = R \begin{bmatrix} i_d \\ i_q \end{bmatrix} + L \frac{d}{dt} \begin{bmatrix} i_d \\ i_q \end{bmatrix} + \omega_s L \begin{bmatrix} -i_q \\ i_d \end{bmatrix} + \begin{bmatrix} v_{d1} \\ v_{q1} \end{bmatrix} \qquad (2)$$

In the d-q reference frame, the active and reactive power absorbed from the grid in per unit is $$P = v_d i_d + v_q i_q$$

$$Q = v_q i_q - v_d i_q \qquad (3)$$

Aligning the d-axis of the reference frame along the stator-voltage position, $v_q$ is zero, and, since the amplitude of the supply voltage is constant, $v_d$ is constant. Therefore, the active and reactive power will be proportional to $i_d$ and $i_q$, respectively. This is the conventional foundation for the decoupled d-q controls [10-15], where the grid-side converter is current regulated, with the direct axis current used to regulate the DC-link voltage and the quadrature axis current component is used to regulate the reactive power.

Figure 5:
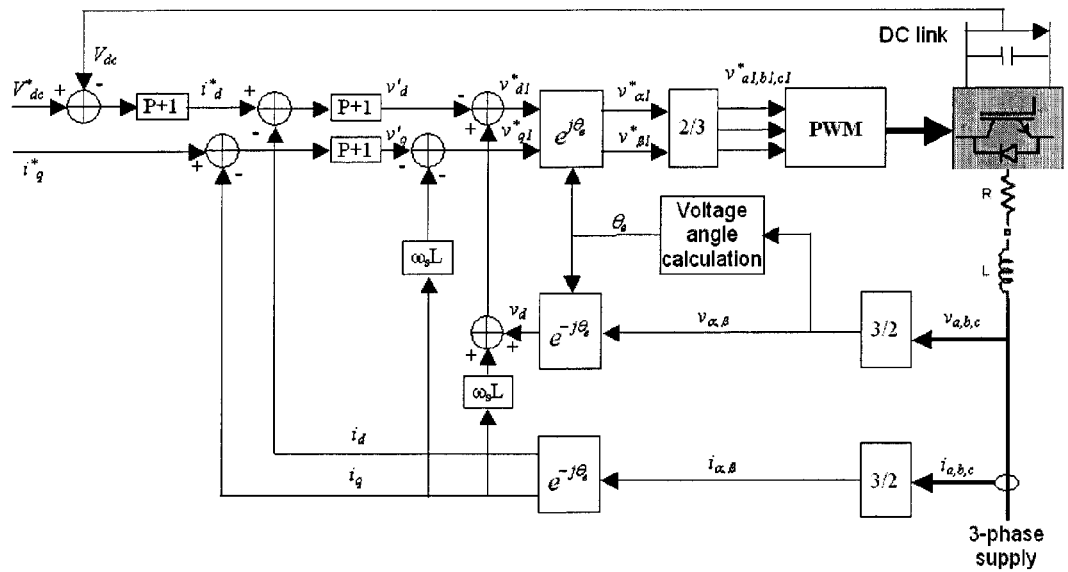
FIG. 5 illustrates an embodiment of a d-q vector control structure for grid-side converter controller in variable-speed wind turbine generators.

The strategy for the conventional decoupled d-q control of the grid-side converter is illustrated in FIG. 5. When the d-q reference frame has the same speed as that of the grid voltage, $\theta_e = \omega_s t$ in FIG. 5. The transfer function for the current control loops is obtained from (2) and is given in (4) in Pena's study [12]. This transfer function could be different depending on how the controller is designed [23]. The d and q reference voltages, $v_{d1}^*$ and $v_{q1}^*$, are computed from the error signals of the d and q currents, respectively, as shown in FIG. 5 and (4) and (5). The $\alpha$ and $\beta$ reference voltages, $V_{\alpha1}^*$ and $V_{\beta1}^*$, are obtained from the d-q reference voltages, correspondingly, through a vector rotation of $e^{j\omega_s t}$. The two $\alpha$ and $\beta$ voltages together are then used to generate the three-phase sinusoidal reference voltage signal for control of the grid-side PWM converter [22]. Note that this control configuration actually intends to control the real and reactive powers through the decoupled d and q reference voltages, respectively.

$$D(s) = \frac{v_d'(s)}{i_d(s)} = \frac{v_q'(s)}{i_q(s)} = L \cdot s + R \qquad (4)$$

$$v_{d1}^* = -v_d' + \omega_s L i_q + v_d,$$
$$v_{q1}^* = -v_q' - \omega_s L i_d \qquad (5)$$

Power Relationships of a Grid-Side Converter with d and q Control Voltages

As shown above, the control of the grid-side converter depends on the d and q reference voltages, $v_{d1}^*$ and $v_{q1}^*$, that are obtained from the error signals of the d and q currents as shown in FIG. 5 and equation (5). The combined d and q reference voltages affect the converter output phasor voltage, $V_{conv}$, on the grid side by varying its amplitude and delay angle [22]. This converter-injected voltage is linearly proportion to the three-phase sinusoidal drive signal in normal converter linear modulation mode. Thus, from the grid point of view, an equivalent circuit can be obtained in FIG. 6 in which the converter injects a 3-phase voltage into the grid depending on the d-q controls. Normally, the grid-side converter needs to be controlled in such a way as to maintain a constant dc-link voltage, which requires that the real power output from one converter (machine/grid side converter) equals the power entered in another converter (grid/machine side converter) when assuming no loss in the PWM converters.

Figure 6:
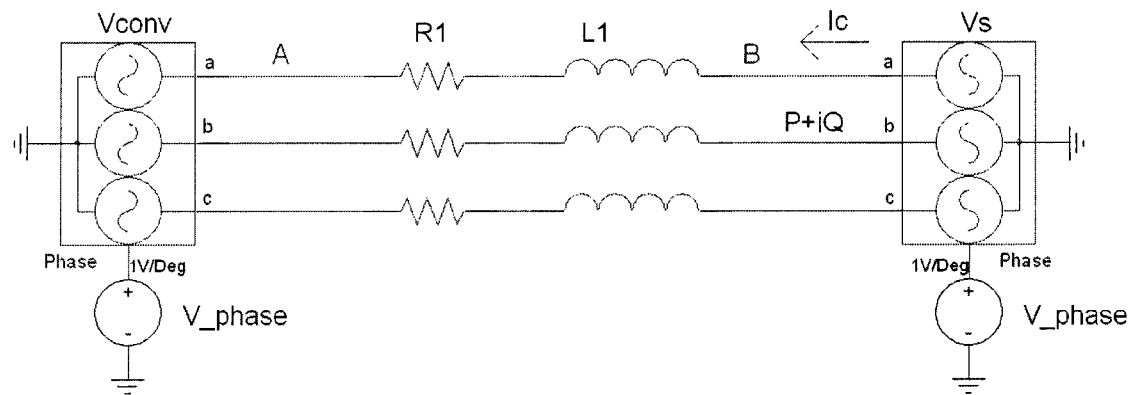
FIG. 6 illustrates an embodiment of a grid-side converter average model representation and equivalent circuit.

Referring to FIG. 6 and assuming there is no line resistance and $V_{conv}=V_{cd}+jV_{cq}$, where $V_{cd}$ and $V_{cq}$, proportional to d and q reference voltages ($v_{d1}*$ and $v_{q1}*$), are the d and q component voltages of the converter voltage injected into the grid side in the grid d-q voltage reference frame. Then, the current flowing between the grid and the converter can be obtained by $$I_c = \frac{V_s - V_{conv}}{jX_L} = \frac{V_s - V_{cd}}{jX_L} - \frac{V_{cq}}{X_L} \quad (6)$$

in which $V_s$ is the grid phasor voltage, $V_{conv}$ is the converter terminal phasor voltage, with $V_{conv}$ leading $V_s$ defined as positive, and $X_L$ stands for the line reactance.

If a passive polarity convention is applied to the grid-side converter, i.e., power flowing into the converter as positive, then the relationship between the power absorbed from the grid and the converter injected voltage, containing both d and q voltage components, can be achieved from the fundamental complex power relationship, i.e., $P_s+jQ_s=\vec{V}_s \vec{I}^*_c$. By solving this power equation together with (6), (7) and (8) are obtained, $$P_s = -\frac{V_s^2}{X_L}\left(\frac{V_{conv}}{V_s}\sin(\delta)\right) = -\frac{V_s V_{cq}}{X_L} \quad (7)$$

$$Q_s = \frac{V_s^2}{X_L}\left(1 - \frac{V_{conv}}{V_s}\cos(\delta)\right) = \frac{V_s}{X_L}(V_s - V_{cd}) \quad (8)$$

in which $V_{conv}$ is the per-unit converter injected voltage on the grid side; $V_s$ is the per-unit voltage of the grid, and $\delta$ represents the angle between the grid phasor voltage, $V_s$, and the converter terminal phasor voltage, $V_{conv}$. It is to be noted that when neglecting line resistance, real and reactive powers, according to (7) and (8), are actually controlled through the q and d components of the reference voltages, respectively, which conflicts with FIG. 4 and (5). In other words, (7) and (8) reveal that the direct axis current component depends more on quadrature axis voltage $V_{cq}$ rather than direct axis voltage $V_{cd}$.

However, if line resistance is considered, the power relationship of (7) and (8) needs to be modified. Under such conditions, the current transferred between the grid and the converter is $$I_c = \frac{V_s - V_{conv}}{R + jX_L} = \frac{V_s - V_{cd} - jV_{cq}}{R + jX_L} \quad (9)$$

When applying (9) to the complex power equation, (10) and (11) are obtained, which implies that the control of either of $V_{cq}$ or $V_{cd}$ can affect both real and reactive power absorbed from the grid. However, computer simulation studies demonstrate that under the normal line impedance condition of $R<X_L$, $V_{cd}$ is more effective for reactive power or $i_q$ control and $V_{cq}$ is more effective for real power or $i_d$ control. In other words, present converter control technologies are unable to control the DC link voltage and reactive power effectively, which could 1) reduce maximum power capture capability of variable-speed wind turbines, 2) reduce wind turbine efficiency, 3) increase losses in electric power systems, and 4) affect electric power system stability and reliability. It is also to be appreciated that the real power absorbed by the grid-side converter is the real power absorbed from the grid minus the power loss of the line as shown by (12).

$$P_s = V_s \cdot \frac{[(V_s - V_{cd})R - V_{cq}X_L]}{R^2 + X_L^2} \quad (10)$$

$$Q_s = V_s \cdot \frac{[(V_s - V_{cd})X_L + V_{cq}R]}{R^2 + X_L^2} \quad (11)$$

$$P_{conv} = P_s - I_c^2 \cdot R \quad (12)$$

Control Principle of the PWM Converter Control

A control principle according to the present invention is developed based on optimal system performance considerations. From FIG. 5, it can be seen that the real power absorbed by the grid-side converter and the reactive power absorbed from the grid are affected by both $V_{cd}$ and $V_{cq}$ controls, and can be obtained from (13) and (14), respectively.

$$P_{conv} = \frac{1}{R^2 + X_L^2}(-RV_{cd}^2 - RV_{cq}^2 + RV_sV_{cd} - X_LV_sV_{cq}) \quad (13)$$

$$Q_s = \frac{1}{R^2 + X_L^2}(X_LV_s^2 - X_LV_sV_{cd} + RV_sV_{cq}) \quad (14)$$

If it is assumed that a control goal of the grid-side converter is to maintain a constant dc-link voltage, i.e., to keep the power absorbed by the generator through the machine-side converter ($P_{rotor}$) equal to the power absorbed by the grid-side converter from the grid ($P_{conv}$) (neglecting the converter losses), and a secondary control goal is to keep the reactive power absorbed from the grid as small as possible. Then, for an active power need by the generator ($P_{gen}$), the solution of $V_{cd}$ and $V_{cq}$ (within the maximum dc-link voltage requirement), that minimizes reactive power $Q_s$ and balances real power between $P_{conv}$ and $P_{gen}$, becomes a nonlinear programming problem as illustrated below.

$$\text{Minimize } Q_s = \frac{1}{R^2 + X_L^2}(X_LV_s^2 - X_LV_sV_{cd} + RV_sV_{cq})$$

$$\frac{1}{R^2 + X_L^2}(-RV_{cd}^2 - RV_{cq}^2 + RV_sV_{cd} - X_LV_sV_{cq}) = P_{gen}$$

$$\text{Subject to: } V_{conv} = \sqrt{V_{cd}^2 + V_{cq}^2} \leq \frac{V_{dc\_max}}{2\sqrt{2}}$$

Figure 7A:
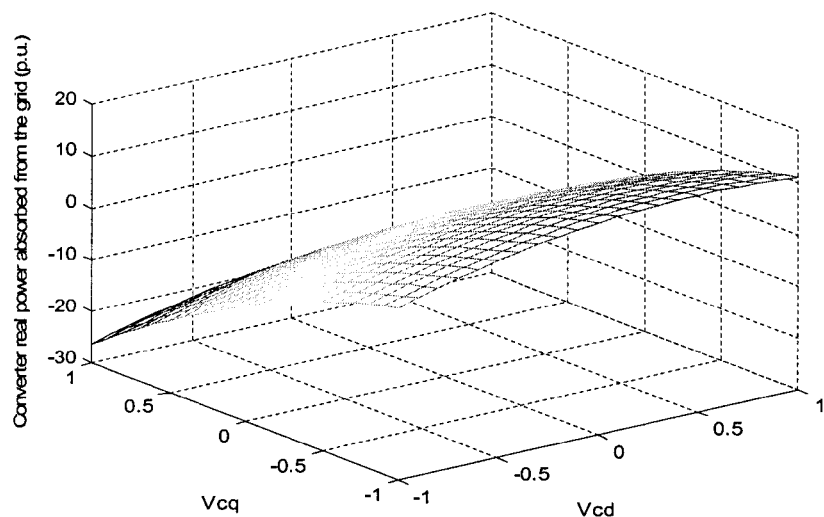
FIG. 7A illustrates an embodiment of a grid-side converter real power characteristics according to an embodiment of the present invention.
Figure 7B:
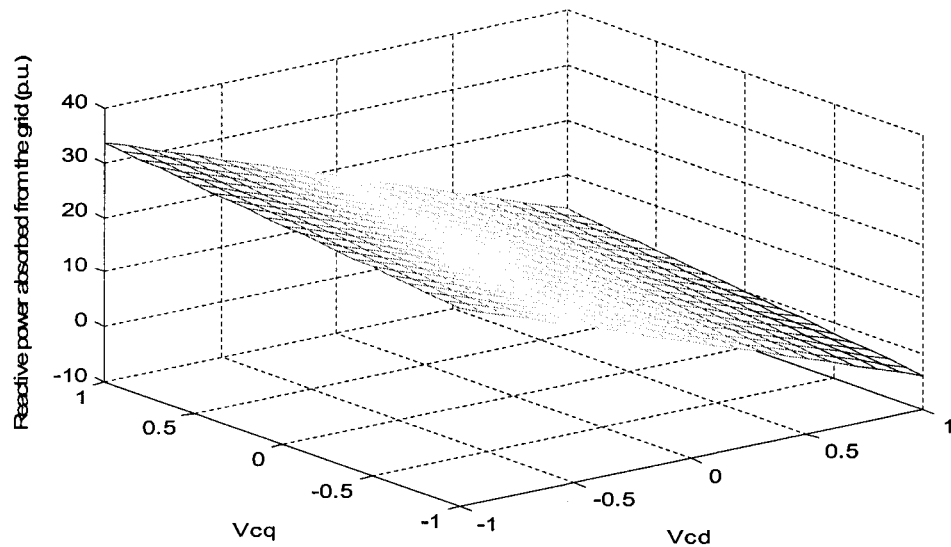
FIG. 7B illustrates an embodiment of a grid-side converter reactive power characteristics according to an embodiment of the present invention.
Figure 7C:
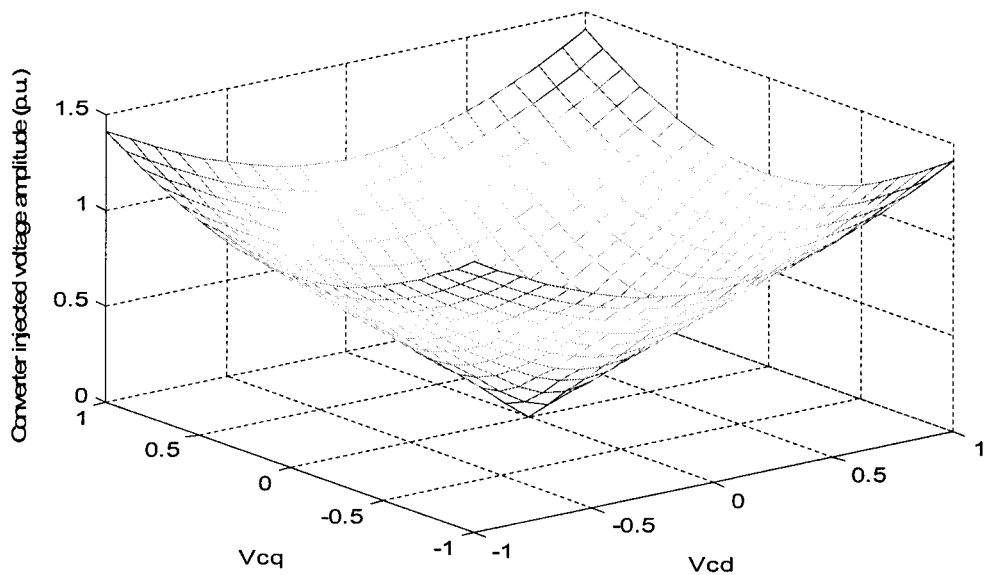
FIG. 7C illustrates an embodiment of amplitude of injected voltage to the grid by a grid-side converter according to an embodiment of the present invention.

In order to develop control approach for the nonlinear programming problem, a simulation can be performed, based on FIG. 6, to investigate how $V_{cd}$ and $V_{cq}$ controls affect the characteristics of real power absorbed by the grid-side converter at point A and reactive power taken from the grid at the point B in FIG. 6. FIGS. 7A-7C show the simulated characteristics of the real and reactive power discussed above as well as the amplitude of the grid-side converter voltage at point A versus both $V_{cd}$ and $V_{cq}$ in a three-dimensional domain. The figures demonstrate a parabolic relationship of the converter real power versus $V_{cd}$ and $V_{cq}$ (FIG. 7A), and a linear relationship of the grid reactive power versus $V_{cd}$ and $V_{cq}$ (FIG. 7B), respectively. According to FIG. 7B, the larger are the $V_{cd}$ positively and the $V_{cq}$ negatively, the smaller is the reactive power absorbed from the grid by the grid-side converter and the grid filter. However, the selection of $V_{cd}$ and $V_{cq}$ should also consider the issue for real power balancing between the machine- and grid-side converters. From FIG. 7A, it is shown that $V_{cq}$ can only take a small negative value for the consideration of the real power balancing. The values of $V_{cd}$ and $V_{cq}$ are also limited by the DC link voltage set value. In other words, when considering the limitation of the DC link voltage, the maximum allowable values for $V_{cd}$ and $V_{cq}$ are even smaller. Therefore, if the reference DC link voltage is set at a low value, it may be impossible to achieve reactive power control goal such as a reference reactive power set value. These factors are considered when designing the controller for the grid-side PWM converter control.

In summary, control principles for the PWM grid-side converter include: 1) From reactive power compensation point of view, the larger are the $V_{cd}$ positively and $V_{cq}$ negatively, the smaller is the reactive power absorbed by the grid-side converter and grid filter from the grid. 2) From real power balancing point of view, however, $V_{cd}$ and $V_{cq}$ should take such values that can balance the real power between the machine- and grid-side converters. 3) From dc-link voltage point of view, the amplitude of the converter injected voltage should be less than $v_{dc}/2\sqrt{2}$, where $V_{dc}$ is the dc link voltage. And, 4) $V_{cq}$ should be used for real power control and $V_{cd}$ should be used for reactive power control. Those factors are considered when designing the grid-side converter controller in order to achieve the objectives of maintaining a constant DC link voltage and compensating reactive power.

Control Approach for PWM Converter Control

The control approach is based on the control principles and regularities discussed above. The development of the converter control system has adopted the technologies and concepts including 1) fuzzy control, 2) adaptive control, and 3) conventional HD control.

Figure 3:
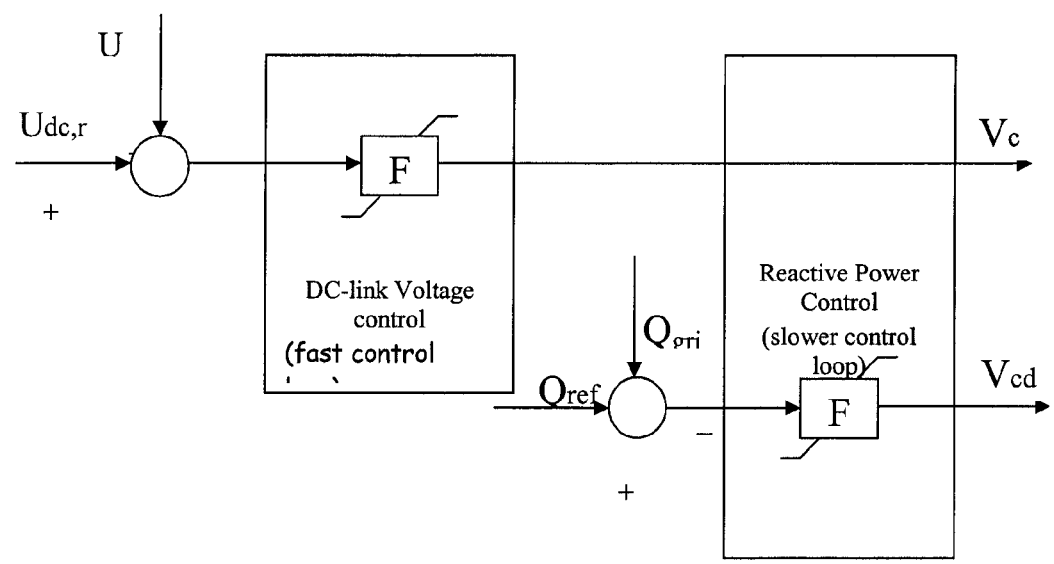
FIG. 3 illustrates an embodiment of a grid-side converter controller in variable-speed wind turbine generators according to the present invention.

The embodiments according to the present invention are also different from present grid-side converter control technologies in at least the following aspects. 1) The present grid-side converter control technologies use d-axis voltage, $V_{cd}$, for DC link voltage control and q-axis voltage, $V_{cq}$, for reactive power control. But, this invention uses $V_{cq}$ for DC link voltage control and $V_{cd}$ for reactive power control. 2) In the present technologies of the grid-side converter control, the d-q voltage control signals, $V_{cd}$ and $V_{cq}$, are obtained by comparing the d- and q-current set points to the actual d- and q-currents to the grid as shown in FIG. 2. In embodiments according to this invention, the q-axis control voltage, $V_{cq}$, is obtained directly by comparing DC link voltage reference value to the actual measured DC link voltage; and the d-axis control voltage, $V_{cd}$, is obtained directly by comparing reactive power reference value to the actual measured reactive power as shown in FIG. 3. And, 3) The generation of the d-q control voltages also considers the nonlinear programming principles discussed above, and use an error driven and modification approach.

Figure 8:
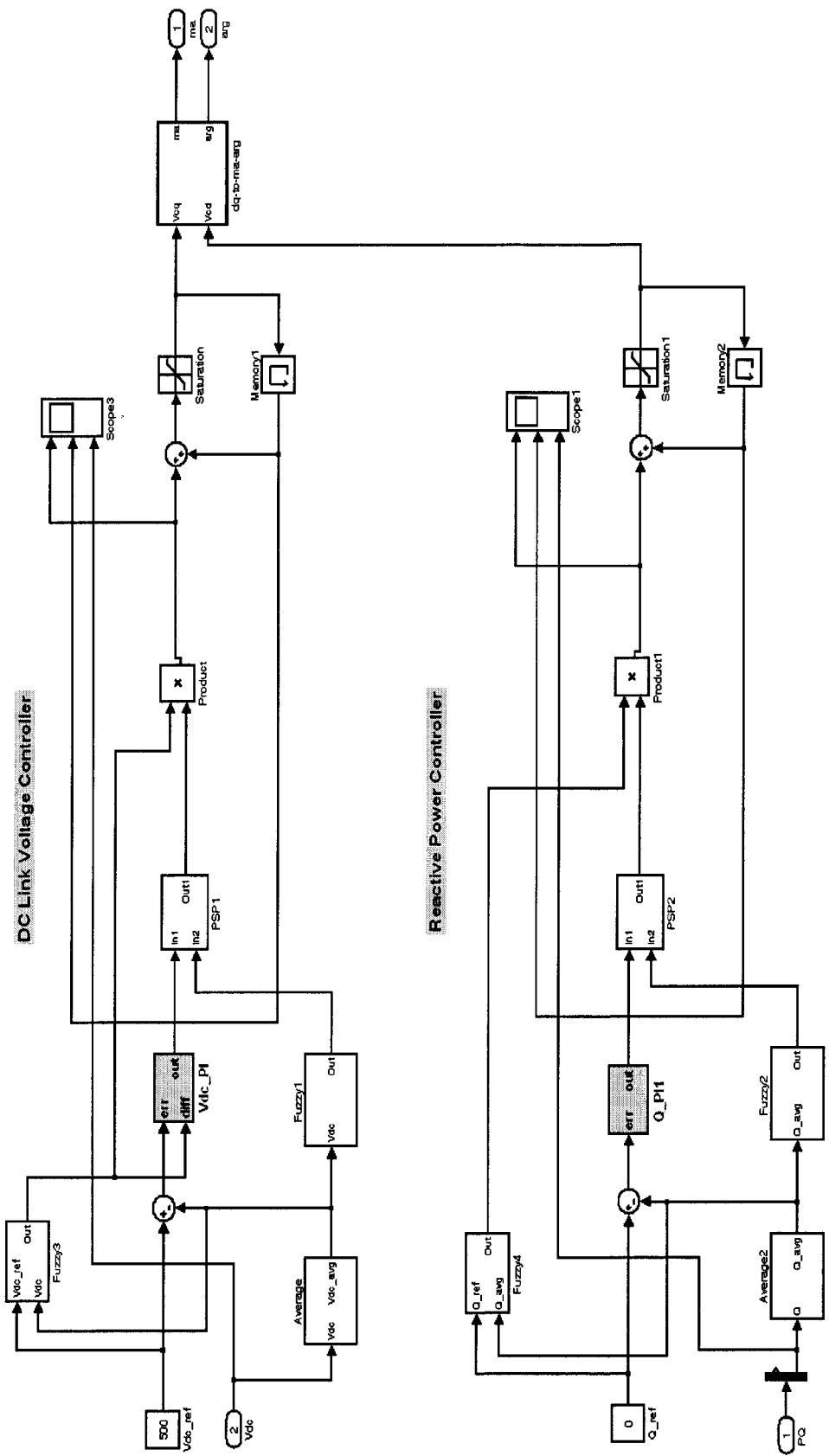
FIG. 8 illustrates an embodiment of a grid-side converter control system according to an embodiment of the present invention.
Figure 10A:
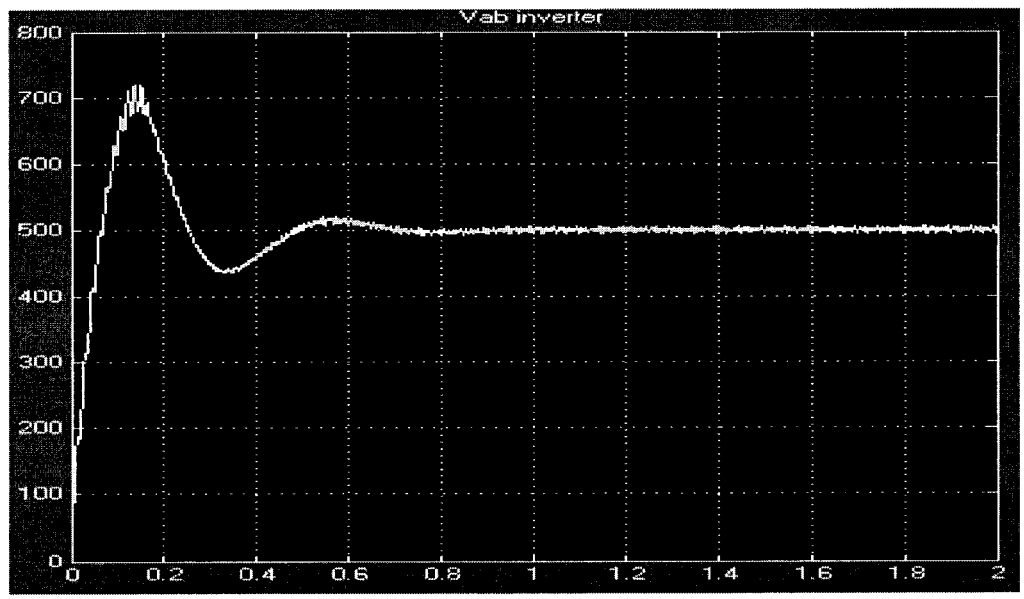
FIGS. 10A-10D illustrate performance comparisons of DC link voltage control and reactive power between conventional control approaches and an embodiment of a control approach according to the present invention.
Figure 10B:
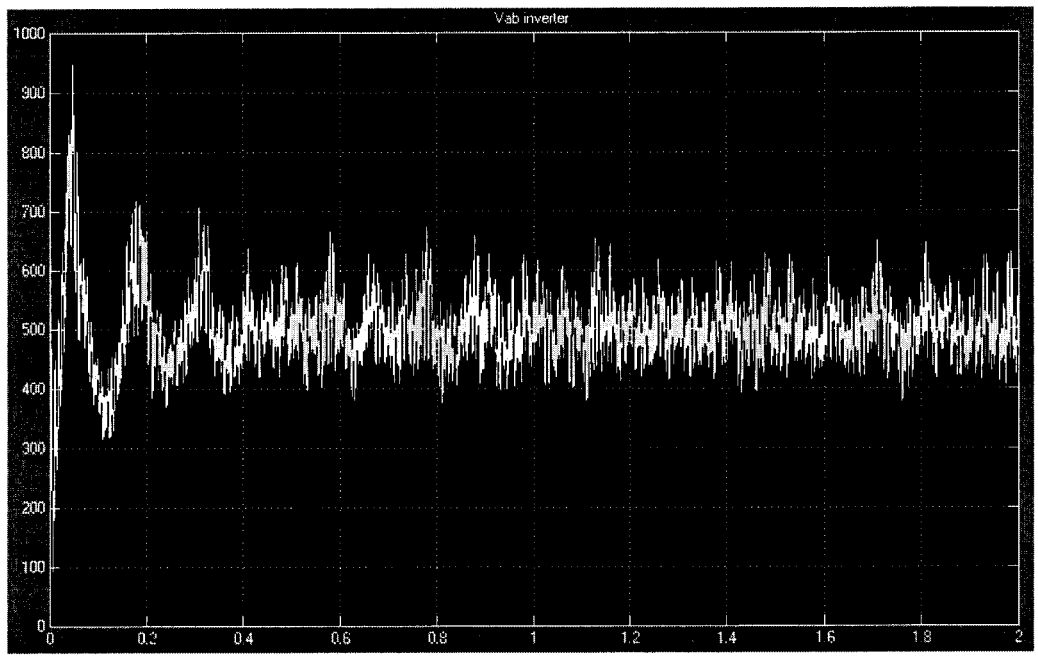
Figure 10C:
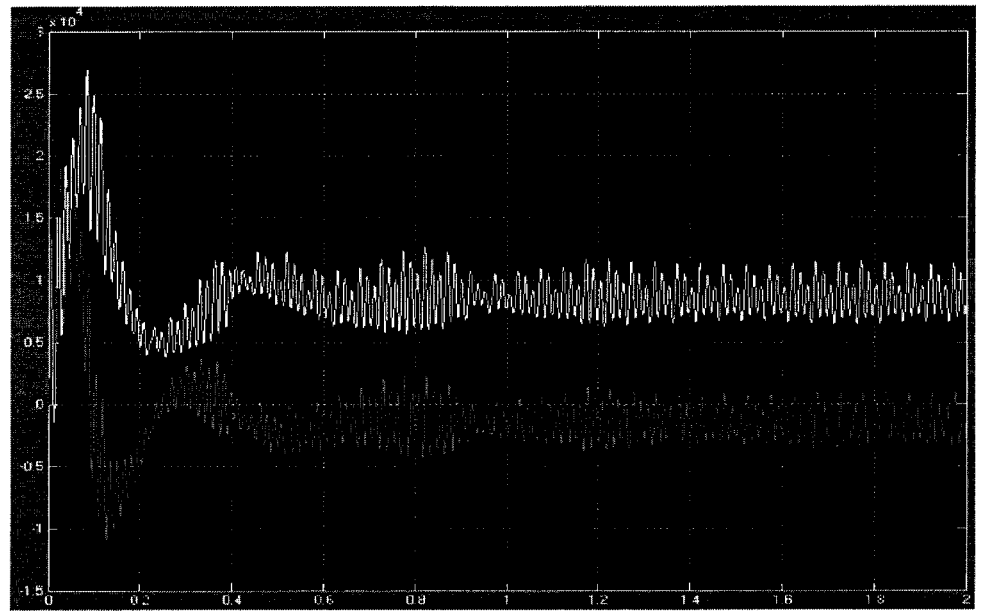
Figure 10D:
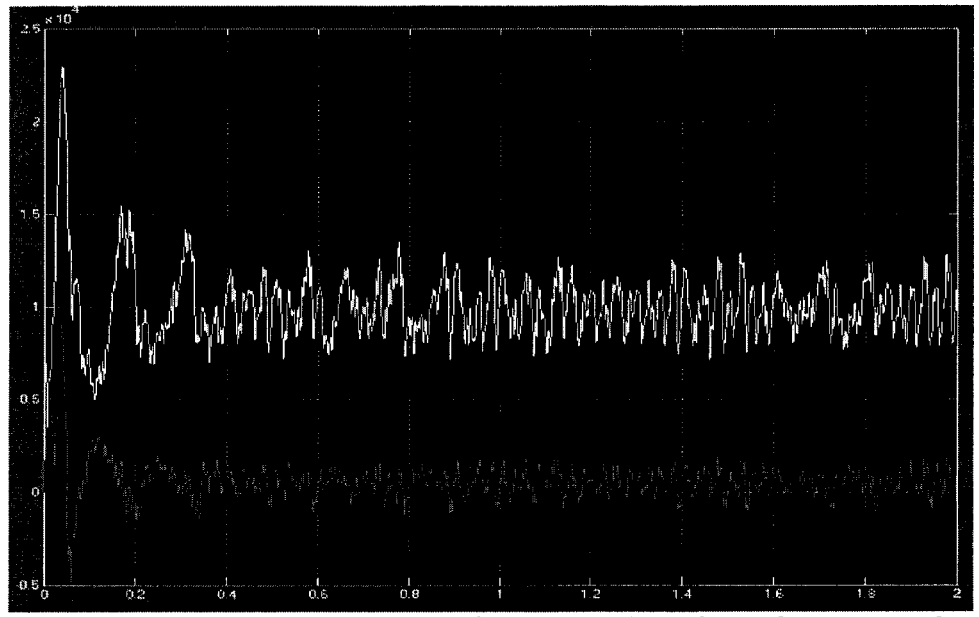

A block diagram of an embodiment of a control system according to an embodiment of the present invention is shown in FIG. 8, which is comprised of a DC link voltage controller and a reactive power controller. FIG. 9 presents an integrated transient simulation system for the PWM converter control which includes 1) machine-side converter, 2) grid-side converter, 3) open-loop control for machine-side converter, and 4) close-loop control for grid-side converter. The performance of embodiments of the control approach according to the present invention are compared with traditional control approaches and demonstrated in FIGS. 10A-10D for a set value of 500V for the DC link voltage.

Example/Simulation

As shown above, the power absorbed or released by the grid-side converter depends on the $V_{cd}$ and $V_{cq}$ components of the converter injected voltage. To maintain a constant dc-link voltage, the power passed to the machine-side converter should equal to the power delivered to the grid from the grid-side converter when neglecting the converter losses. Thus, while real power flows from the generator to the machine-side converter, the grid-side converter should be operated as an inverter and controlled in such a way as to deliver the same amount of real power to the grid. While real power flows from the machine-side converter to the generator, the grid-side converter should be operated as a rectifier and controlled in such a way as to receive the same amount of the power from the grid. Therefore, in order to examine the real power output at the grid-side converter against the input power at the machine-side converter but the reactive power compensation at the grid side, it is appropriate to inspect the real and reactive powers before and after the line impedance, respectively, in FIG. 6. But, this would be challenging to examine when line resistance is considered, making simulation valuable for the analysis.

The power transfer characteristics of the grid-side converter are investigated through simulation based on FIG. 6, in which the grid side voltage, $V_s$, is taken as the reference and the amplitude and angle of the converter output voltage, $V_{conv}$, varies because of the d-q control as shown in FIGS. 3 and 5.

A. Power Characteristics by $V_{cd}$ Controls

Figures 11A, 11B:
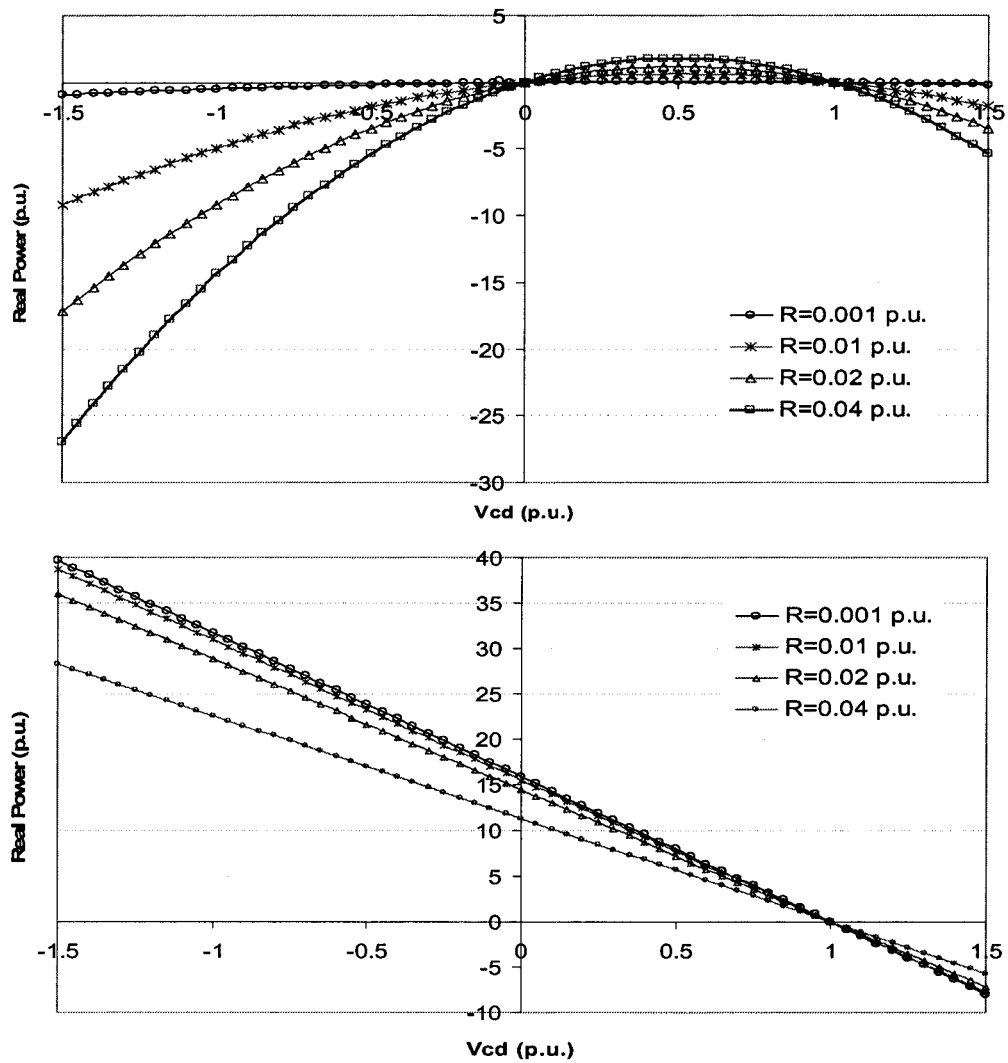
FIGS. 11A and 11B illustrate simulated real and reactive power characteristics in an embodiment according to the present invention.

The simulation-based analysis corresponding to $V_{cd}$ control here represents a condition of variable $V_{cd}$, but constant $V_{cq}$. The line reactance used in the simulation is $X_L=0.063$ pu. FIGS. 11A and 11B present typical real and reactive power characteristics as the $V_{cd}$ component of the converter injected voltage changes from −1.5 to 1.5 p.u. while the $V_{cq}$ is fixed at 0 p.u. for several line resistance conditions. Simulation analysis for different values of R under similar $V_{cd}$ and $V_{cq}$ conditions demonstrates the following regularities.

1) When $R<<X_L$, the converter real power is almost zero and is almost not affected by $V_{cd}$ but its reactive power varies from inductive to capacitive as $V_{cd}$ changes from $V_{cd}<V_s$ to $V_{cd}>V_s$. In other words, unlike traditional understanding [10-15], $V_{cd}$ is only helpful in controlling reactive power absorbed from the grid when $R<<X_L$, implying that the $V_d$ control as shown in FIG. 5 and (5) cannot effectively modify $I_d$ and real power as required by (3). This result also agrees with (7) and (8).

2) When R increases, the effectiveness of reactive power control by $V_{cd}$ decreases (FIG. 11B) and $V_{cd}$ involves in real power controls too (FIG. 11A). This result may cause a false understanding, especially for design and evaluation of a controller through transient simulation and laboratory transient experiments, that modifying $V_{cd}$ is good for real power control.

B. Power Characteristics by $V_{cq}$ Controls

Figures 12A, 12B:
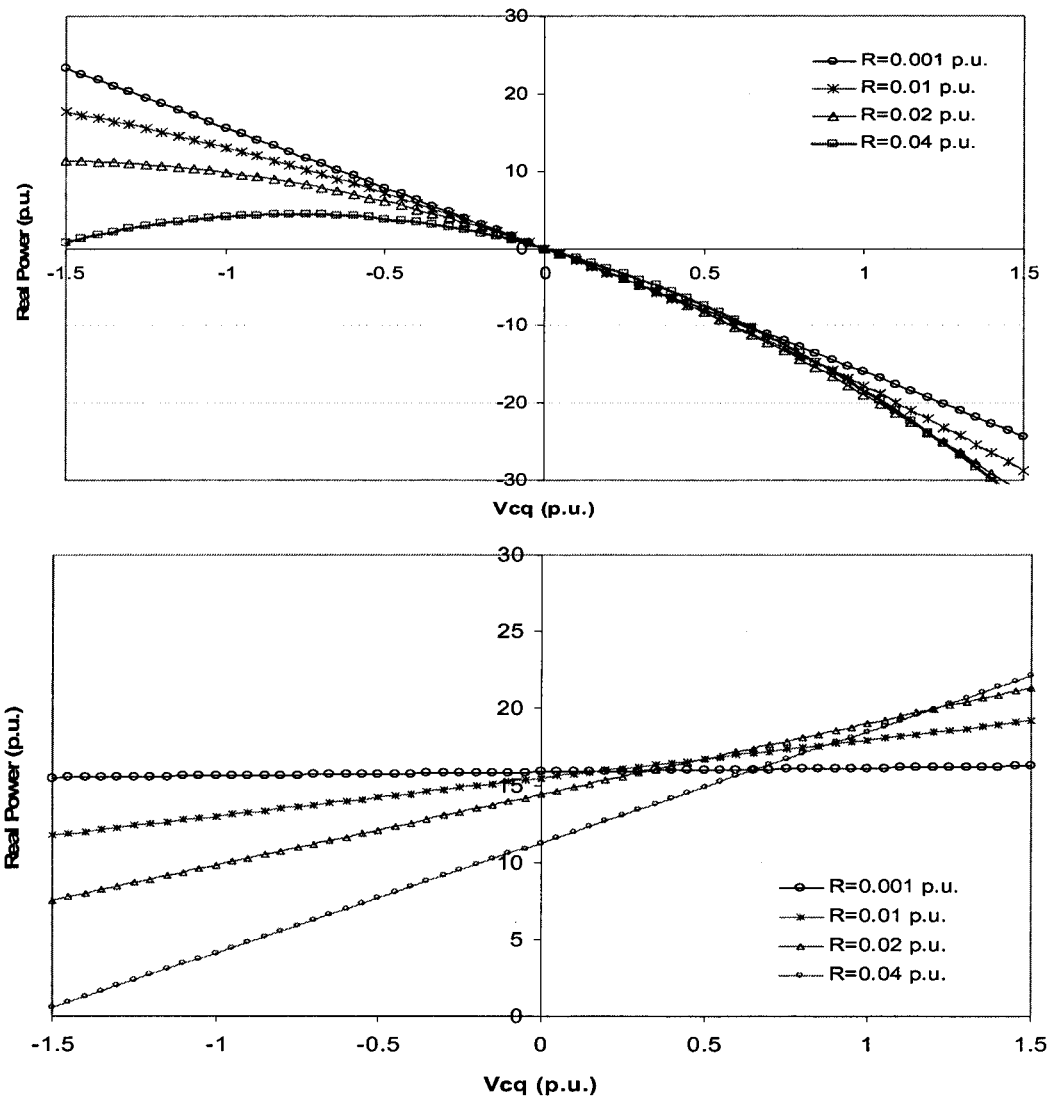
FIGS. 12A and 12B illustrate simulated real and reactive power characteristics in an embodiment according to the present invention.

Unlike $V_{cd}$ control, the control of $V_{cq}$ affects the converter power characteristics differently. FIGS. 12A and 12B present typical real and reactive power characteristics as the $V_{cq}$ component of the converter injected voltage changes from −1.5 to 1.5 p.u. while the $V_{cd}$ is fixed at 0 p.u. for several line impedance conditions. Various simulation studies for different values of R under similar $V_{cd}$ and $V_{cq}$ conditions illustrate the following regularities.

1) As $R \ll X_L$, the converter reactive power keeps almost constant but its real power varies from absorbing to generating while $V_{cq}$ changes from a negative value to a positive value. In other words, $V_{cq}$ is effective for active power control but inefficient for reactive power control. This is also consistent with the conclusions obtained from the analysis of (7) and (8).

2) As R increases, however, the effectiveness of real power control by $V_{cq}$ decreases (FIG. 12A) and $V_{cq}$ participates reactive power controls too (FIG. 12B). The larger is the ratio of $R/X_L$, the more $V_{cq}$ can contribute to the reactive power control. This result may lead to a design of using $V_{cq}$ for reactive power control. However, the high $R/X_L$ ratio may cause more losses on the line.

C. Power Characteristics by Combined $V_{cd}$ and $V_{cq}$ Controls

As shown in FIGS. 3 and 5, the DFIG grid-side converter is normally controlled through decoupled $V_{cd}$ and $V_{cq}$ controls to compensate the drawbacks caused by the $V_{cd}$ or $V_{cq}$ control alone as illustrated in V-A and V-B. Under the decoupled d-q control condition, the real power absorbed by the grid-side converter and the reactive power absorbed from the grid are affected by both $V_{cd}$ and $V_{cq}$. It is therefore important to investigate the impact of the decoupled d-q controls, based on FIG. 6, on the characteristics of real power at the grid-side converter and reactive power taken from the grid through simulation.

The simulation study for the combined $V_{cd}$ and $V_{cq}$ control is investigated in two ways: 1) keeping $V_{cq}$ constant for several different values and examining real and reactive control characteristics versus $V_{cd}$ for each constant value of $V_{cq}$, and 2) keeping $V_{cd}$ constant for several different values and examining real and reactive control characteristics versus $V_{cq}$ for each constant value of $V_{cd}$. The line resistance and reactance used in the simulation are 0.016 p.u. and 0.063 p.u., respectively.

Figures 13A, 13B:
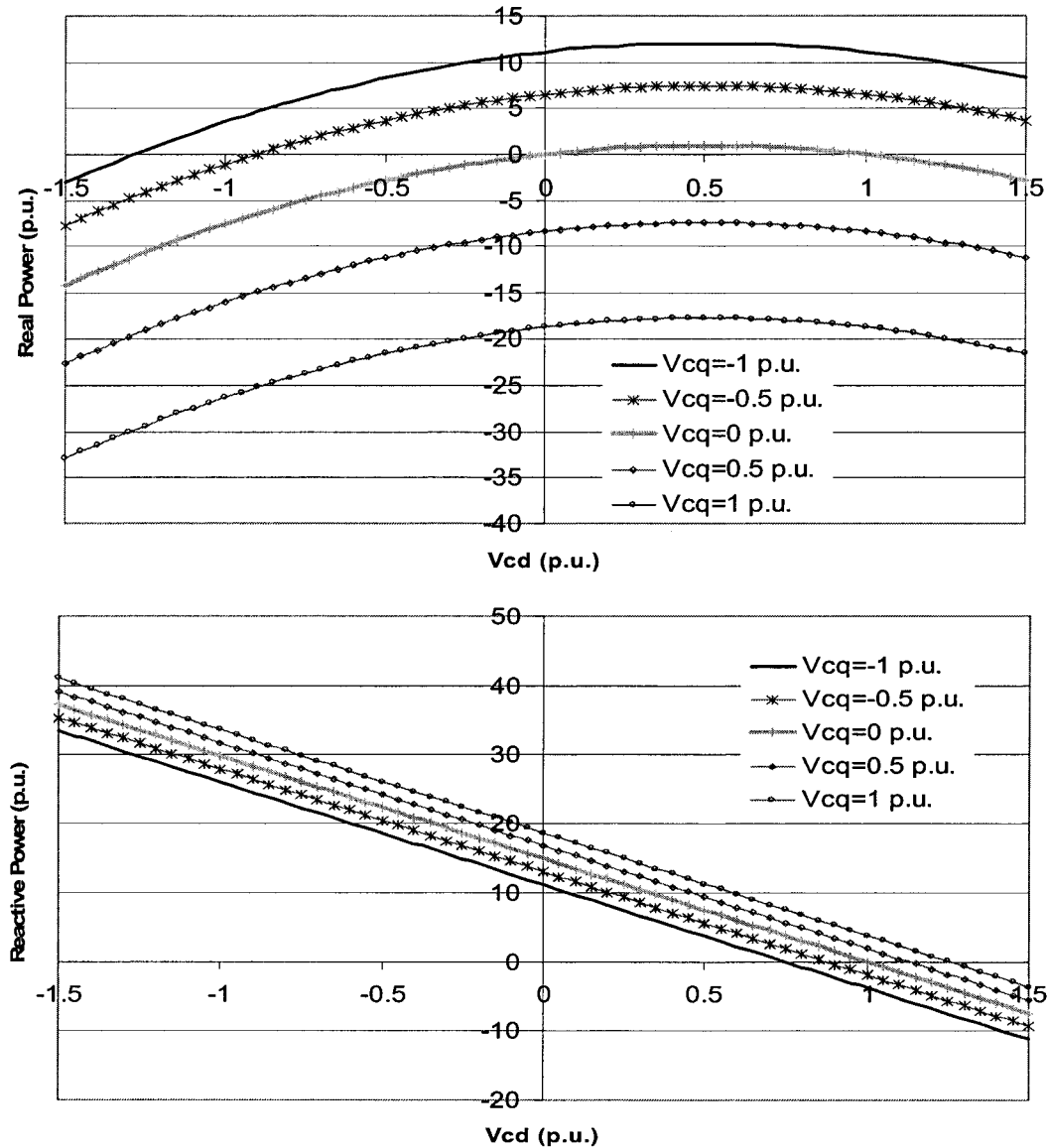
FIGS. 13A and 13B illustrate simulated real and reactive power characteristics in an embodiment according to the present invention.
Figures 14A, 14B:
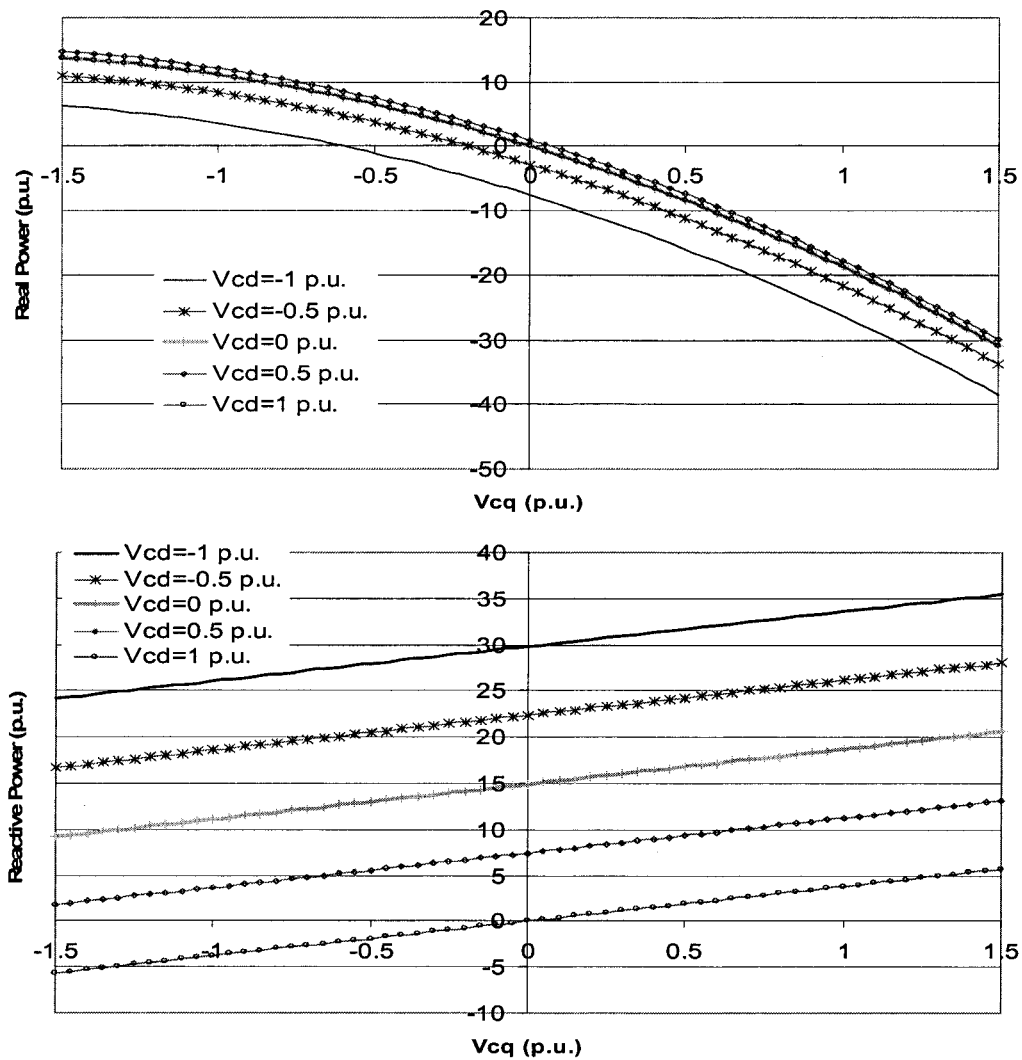
FIGS. 14A and 14B illustrate simulated real and reactive power characteristics in an embodiment according to the present invention.

FIGS. 13A and 13B show, for several constant $V_{cq}$ values, how the real and reactive power characteristics change as $V_{cd}$ varies, and FIG. 14 shows, for several constant $V_{cd}$ values, how the real and reactive power characteristics alter as $V_{cq}$ varies. From the analysis of both figures when considering the normal condition of $X_L > R$, the following conclusions are obtained.

1) When increasing $V_{cq}$ negatively, the converter real power versus $V_{cd}$ characteristics shifts upward (FIG. 13A), meaning that the converter can be controlled to meet more generator real power consumption need.

2) While increasing $V_{cq}$ positively, the converter real power versus $V_{cd}$ characteristics shifts downward (FIG. 13A). When the characteristic curve is shifted below zero real power line, the converter can only be controlled to deliver real power to the grid and the generator has to generate the same amount of real power supplied to the machine-side converter under such the condition in order to keep the dc-link voltage constant.

3) Modifying $V_{cq}$ only results in minor change of reactive power versus $V_{cd}$ characteristics (FIG. 13B), implying that $V_{cq}$ is less effective for reactive power control.

4) When increasing $V_{cd}$ negatively, the converter reactive power versus $V_{cq}$ characteristics shifts upward (FIG. 14B), meaning that under the same value of $V_{cq}$, the converter absorbs more reactive power from the grid.

5) While increasing $V_{cd}$ positively, the converter reactive power versus $V_{cq}$ characteristics shifts downward (FIG. 14B), meaning that the converter absorbs less reactive power from the grid or even to a point of leading power factor.

6) Modification of $V_{cd}$ only causes minor alteration of real power versus $V_{cq}$ characteristics (FIG. 14A), implying that $V_{cd}$ is less effective for real power control.

In summary of the $V_{cd}$ and $V_{cq}$ controls, when considering the line resistance, the following conclusions are obtained: 1) From a reactive power compensation point of view, the larger are the $V_{cd}$ positively and $V_{cq}$ negatively, the smaller is the reactive power absorbed by the converter from the grid (FIGS. 13B and 14B); 2) From the real power point of view, however, $V_{cd}$ and $V_{cq}$ should take such values that can balance the real power between the machine- and grid-side converters; and, 3) from a dc-link voltage point of view, the amplitude of the converter injected voltage should be less than $V_{dc\_max}/2\sqrt{2}$, where $V_{dc\_max}$ is the maximum allowable dc link voltage set value.

Computer or Computing Device

Figure 15A:
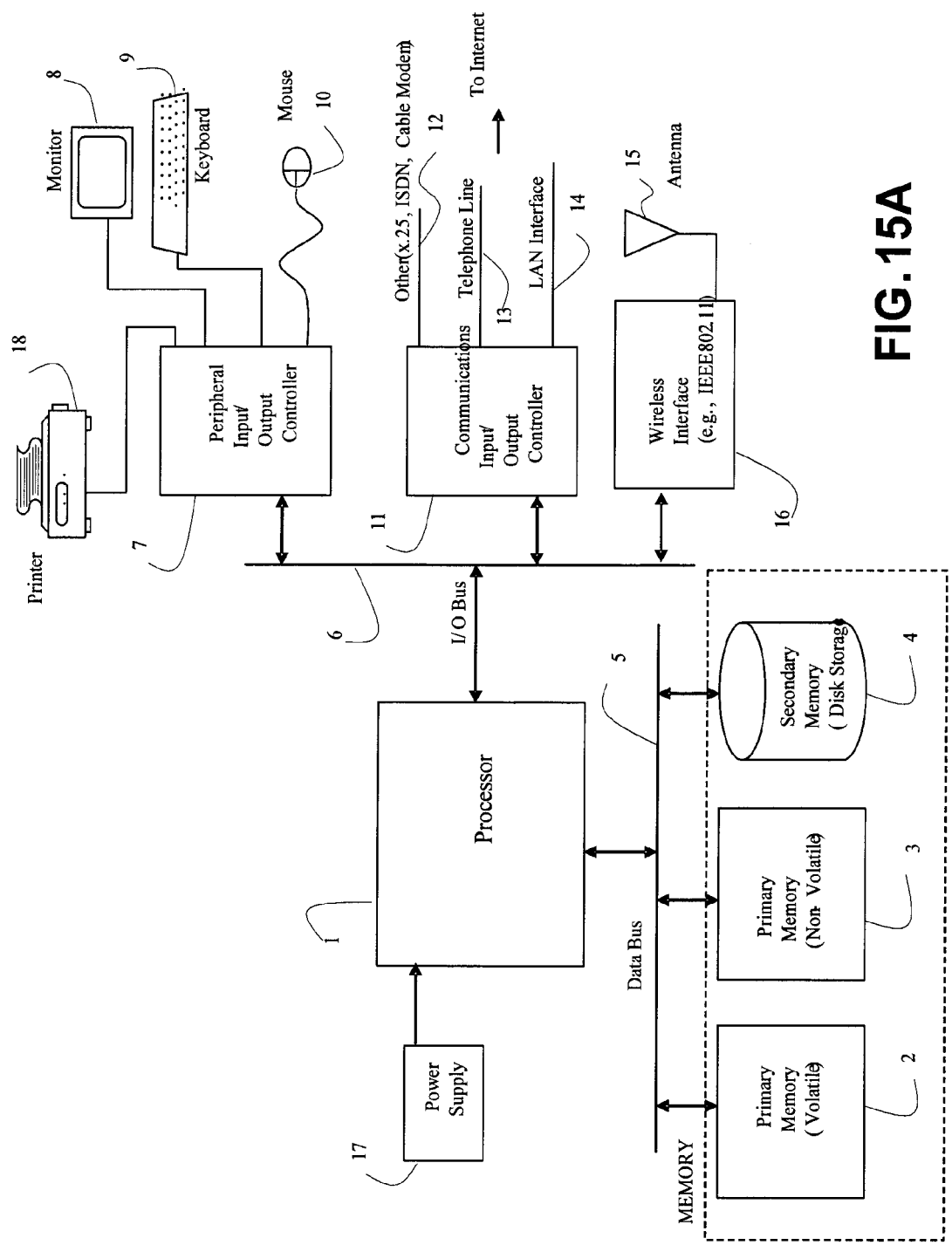
FIG. 15A is an exemplary computing device that can be used to practice aspects of the preferred embodiment.

In the preferred embodiments referenced herein, a "computer," "computing device," "controller," or "server" may be referenced such that steps of the control process may be performed by such computer and the control system can incorporate a computer or processor or a computer may be utilized in performing a simulation of the control systems and methods described herein. Such computer may be, for example, a mainframe, desktop, notebook or laptop, a hand held device such as a data acquisition and storage device, or it may be a processing device embodied within another apparatus such as, for example, a processor incorporated into telephonic system such as a private branch exchange (PBX) system or network devices having processors. In some instances the computer may be a "dumb" terminal used to access data or processors over a network such as the Internet. Turning to FIG. 15A, one embodiment of a computing device is illustrated that can be used to practice aspects of the preferred embodiment. In FIG. 15A, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or a standard 3G wireless telecommunications protocols, such as CDMA2000 1x EV-DO, GPRS, W-CDMA, or other protocol.

Figure 15B:
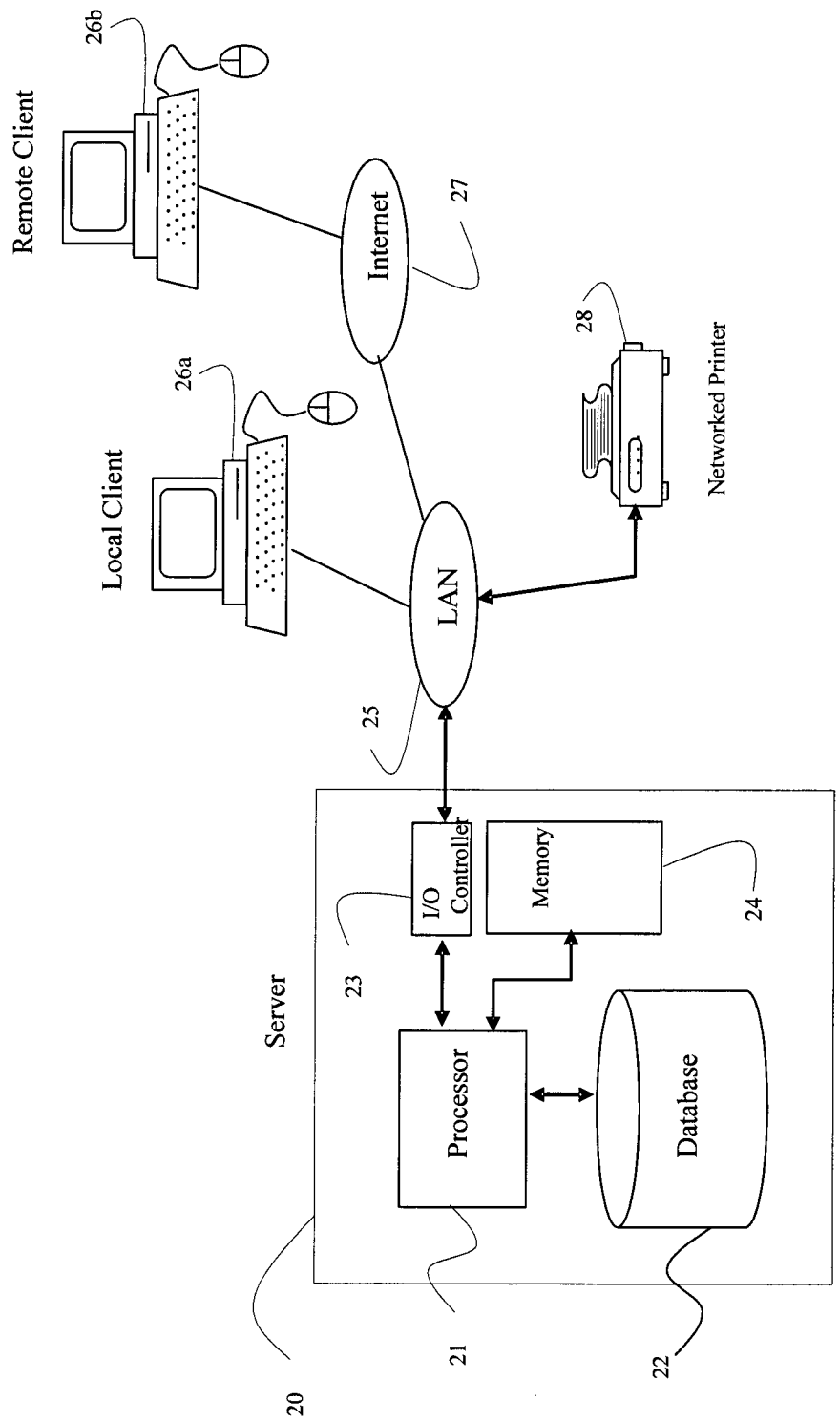
FIG. 15B is an alternative embodiment of a processing system of that shown in FIG. 1A that may be used in embodiments according to the present invention.

An alternative embodiment of a processing system that may be used is shown in FIG. 15B. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to a wide area network 27, such as the Internet. A remote client computer 26b may execute a web browser, so that the remote client 26b may interact with the server as required by transmitted data through the wide area network 27, over the LAN 25, and to the server 20.

Those skilled in the art of data networking will realize that many other alternatives and architectures are possible and can be used to practice the preferred embodiments. The embodiments illustrated in FIGS. 15A and 15B can be modified in different ways and be within the scope of the present invention as claimed.

CONCLUSION

The above represents only a few examples of how a particular system might be implemented. There are numerous variations and additional features and capabilities that might be included in other variants.

The above examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention.

Throughout this application, various publications and/or standards may be referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following inventive concepts.

REFERENCES

Unless otherwise indicated, each of the following are fully incorporated herein by reference and made a part hereof:

[1] GE Wind Energy. GE Wind Turbine. Brochures. Available from http://www.gepower.com/prod_serv/products/wind_turbines/en/index.htm.

[2] Nordex wind turbine brochures. Available from http://www.nordex-online.com/en/products-services/wind-turbines.html.

[3] Vestas wind turbine brochures. Available from http://www.vestas.com/vestas/global/en/Products/Download_brochures/download_brochurer.htm.

[4] T. Burton, D. Sharpe, N. Jenkins, and E. Bossanyi, *Wind Energy Handbook*. John Wiley & Sons, Ltd, 2001.

[5] T. Ackermann and L. Söder, "An overview of wind energy-status 2002," *Renew. Sustain* Energy Rev., vol. 6, no. 1-2, pp. 67-128, February/April 2002.

[6] W. L. Kling and J. G. Slootweg, "Wind turbines as Power Plants," in Proceedings of the IEEE/Cigré workshop on Wind Power and the Impacts on Power Systems, 17-18 Jun. 2002, Oslo, Norway.

[7] L. H. Hansen, L. Helle, F. Blaabjerg, E. Ritchie, S. Munk-Nielsen, H. Bindner, P. Sørensen, and B. Bak-Jensen, "Conceptual survey of generators and power electronics for wind turbines," Risø National Laboratory, Roskilde, Denmark, Tech. Rep. Risø-R-1205(EN), ISBN 87-550-2743-8, December 2001.

[8] L. Morel, H. Godfroid, A. Mirzaian, and J. Kauffmann, "Double-fed induction machine: converter optimization and field oriented control without position sensor," *IEE Proc. Electr. Power Appl.*, vol. 145, no. 4, pp. 360-368, July 1998.

[9] L. Xu and C. Wei, "Torque and Reactive Power Control of a Doubly Fed Induction Machine by Position Sensorless Scheme," *IEEE Trans. Industry Application.*, vol. 31, no. 3, pp. 636-642, May/June 1995.

[10] P. V. Meirhaeghe, "Double fed induction machine: a EUROSTAG model," *Tractebel Engineering*, available from http://www.eurostag.be/scientific_publications/scientific_publications.htm, last date that the site was viewed is May 17, 2005.

[11] Hansen, A. D., boy, F., Sørensen, P., and Blaabjerg, F., "Overall control strategy of variable speed doubly-fed induction generator wind turbine," In: Grid integration and electrical systems of wind turbines and wind farms (CD-ROM). *Nordic wind power conference* 2004 (*NWPC04*), Göteborg (SE), 1-2 Mar. 2004. (Chalmers University of Technology, Göteborg, 2004) 7 p.

[12] R. Pena, J. C. Clare, and G. M. Asher, "Doubly fed induction generator using back-to-back PWM converters and its application to variable speed wind-energy generation,"*IEE Proc.-Electr. Power Appl.*, Vol. 143, No 3, May 1996.

[13] B. Hopfensperger, D. Atkinson, and R. A. Lakin, "Stator flux oriented control of a cascaded doubly-fed induction machine," *IEE Proc. Electr. Power Appl.*, vol. 146, no. 6, pp. 597-605, November 1999.

[14] S. Wang and Y. Ding, "Stability analysis of field oriented doubly-fed induction machine drive based on computer simulation," *Electric Machines and Power Systems*, vol. 21, no. 1, pp. 11-24, 1993.

[15] J. L. Duarte, A. V. Zwam, C. Wijnands, and A. Vandenput, "Reference frames fit for controlling pwm rectifiers, "*IEEE Trans. Power Electron.*, vol. 46, no. 3, pp. 628-630, June 1999.

[16] A. Petersson, T. Petru, and T. Thiringer, "Grid Disturbance Response of Wind Turbines Equipped with Induction Generator and Doubly-Fed Induction Generator," in *Proceedings of 2003 IEEE PES General Meeting*, Toronto, Canada, Jul. 13-17, 2003.

[17] J. G. Slootweg, S. W. H. de Haan, H. Polinder, and W. L. King, "General model for representing variable speed wind turbines in power system dynamics simulations," IEEE Trans. On Power Systems, Vol. 18, No. 1, pp. 144-151, February 2003.

[18] J. Feltes, Y. Kazachkov, and R. Zavadil, "Modeling Wind Farms for Power System Stability Studies," in Proceedings of 2003 IEEE PES General Meeting, Toronto, Canada, Jul. 13-17, 2003.

[19] D. Beato, J. L. Fernandez, R. Iturbe, P. Ledesma, J. M. Rodriguez, J. Usaola, and J. R. Wilhelmi, "Transient Stability Studies in Grids with Great Wind Power Penetration: Modeling Issues and Operation Requirements," in *Proceedings of 2003 IEEE PES General Meeting*, Toronto, Canada, Jul. 13-17, 2003.

[20] Nicholas W. Miller, William W. Price, and Juan J. Sanchez-Gasca, "Dynamic Modeling of GE 1.5 and 3.6 Wind Turbine-Generators," GE Power Systems, Oct. 27, 2003.

[21] Shuhui Li and Sitanshu Sinha, "A Simulation Analysis of Double-Fed Induction Generator for Wind Energy Conversion Using PSpice," in *Proceedings of 2006 IEEE PES General Meeting*, 18-22 Jun. 2006, Montreal, Quebec Canada.

[22] N. Mohan, T. M. Undeland, and W. P. Robbins, Power Electronics: Converters, Applications, and Design, $3^{rd}$ Ed., John Wiley & Sons Inc., October 2002.

[23] G. F. Franklin, J. D. Powell and M. Workman, *Digital Control of Dynamic Systems*, Prentice hall, 2000.

What is claimed is:

1. A method of controlling a variable-speed wind-turbine comprising:
   providing an AC/DC/AC PWM frequency converter comprised of a machine-side self-commutated PWM converter, a DC-link, and a grid-side self-commutated PWM converter, wherein the machine-side self-commutated PWM converter is operably connected to the wind turbine and the grid-side self-commutated PWM converter is operably connected to an electrical grid and the DC-link interconnects the machine-side self-commutated PWM converter and the grid-side self-commutated PWM converter;
   providing a control system operably connected to the AC/DC/AC PWM frequency converter, wherein the control system is comprised of a DC-link voltage controller and a reactive power controller;
   providing a q-axis control voltage, Vcq, to the control system, wherein Vcq is used by the DC-link voltage controller to control voltage of the DC-link and Vcq is determined by comparing a DC-link voltage reference value to a measured DC-link voltage value;
   providing a d-axis control voltage, Vcd, to the control system, wherein Vcd is used by the reactive power controller to control reactive power absorbed from the electrical grid by the grid-side self-commutated PWM converter and Vcd is determined by comparing a reactive power reference value to a measured reactive power value; and
   injecting, by the grid-side self-commutated PWM converter, a voltage into the electrical grid, wherein the injected voltage is less than $V_{dc}/2\sqrt{2}$, where Vdc is the measured DC-link voltage value.

2. The method of claim 1, wherein the larger the Vcd is positive and the larger the Vcq is negative, the smaller is the reactive power absorbed from the electrical grid by the grid side self-commutated PWM converter.

3. The method of claim 1, wherein Vcq is used for real power control of the wind turbine and Vcd is used for reactive power control of the wind turbine.

4. The method of claim 1, wherein the control system comprises fuzzy logic control, adaptive logic control, PID control technologies, or combinations thereof.

5. A system for controlling a variable-speed wind-turbine comprising:
   an AC/DC/AC PWM frequency converter comprised of a machine-side self-commutated PWM converter, a DC-link, and a grid-side self-commutated PWM converter, wherein the machine-side self-commutated PWM converter is operably connected to the wind turbine and the grid-side self-commutated PWM converter is operably connected to an electrical grid and the DC-link interconnects the machine-side self-commutated PWM converter and the grid-side self-commutated PWM converter; and
   a control system comprised of a DC-link voltage controller and a reactive power controller operably connected to the AC/DC/AC PWM frequency converter,
   wherein the DC-link voltage controller compares a DC-link voltage reference value and a measured DC-link voltage value and determines a q-axis control voltage, Vcq, where Vcq is used by the DC-link voltage controller to control voltage of the DC-link,
   wherein the reactive power controller compares a reactive power reference value to a measured reactive power value and determines a d-axis control voltage, Vcd, where Vcd is used by the reactive power controller to control reactive power absorbed from the electrical grid by the grid-side self-commutated PWM converter,
   wherein the grid-side self-commutated PWM converter injects a voltage into the electrical grid, and the injected voltage is less than $V_{dc}/2\sqrt{2}$, where Vdc is the measured DC-link voltage value.

6. The system of claim 5, wherein the larger the Vcd is positive and the larger the Vcq is negative, the smaller is the reactive power absorbed from the electrical grid by the grid-side self-commutated PWM converter.

7. The system of claim 5, wherein Vcq is used for real power control of the wind turbine and Vcd is used for reactive power control of the wind turbine.

8. The system of claim 5, wherein the control system comprises fuzzy logic control, adaptive logic control, PID control technologies, or combinations thereof.

* * * * *